(12) United States Patent
DeNolf et al.

(10) Patent No.: US 11,467,462 B2
(45) Date of Patent: Oct. 11, 2022

(54) ELECTRO-OPTIC APPARATUS AND SEAL SYSTEM

(71) Applicant: Gentex Corporation, Zeeland, MI (US)

(72) Inventors: Garret C. DeNolf, Grand Rapids, MI (US); Gary J. Dozeman, Zeeland, MI (US); George A. Neuman, Holland, MI (US); William L. Tonar, Holland, MI (US); Mario F. Saenger Nayver, Zeeland, MI (US); John S. Anderson, Holland, MI (US); Sheng Liu, Holland, MI (US); Yuping Lin, Tucker, GA (US); David J. Cammenga, Zeeland, MI (US); Joel A. Stray, Hudsonville, MI (US); Scott S. McNees, Bloomingdale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 290 days.

(21) Appl. No.: 16/705,501

(22) Filed: Dec. 6, 2019

(65) Prior Publication Data
US 2020/0183244 A1 Jun. 11, 2020

Related U.S. Application Data

(60) Provisional application No. 62/776,862, filed on Dec. 7, 2018, provisional application No. 62/835,227, filed on Apr. 17, 2019.

(51) Int. Cl.
*G02F 1/161* (2006.01)
*G02F 1/155* (2006.01)

(52) U.S. Cl.
CPC .............. *G02F 1/161* (2013.01); *G02F 1/155* (2013.01)

(58) Field of Classification Search
CPC .... G02F 1/161; G02F 1/155; G02F 2001/164; G02F 1/15
(Continued)

(56) References Cited

U.S. PATENT DOCUMENTS

| 5,928,572 A | 7/1999 | Tonar et al. |
|---|---|---|
| 5,998,617 A | 12/1999 | Srinivasa et al. |

(Continued)

FOREIGN PATENT DOCUMENTS

| JP | 2004192009 A | 7/2004 |
|---|---|---|
| WO | 9842796 A1 | 10/1998 |

(Continued)

OTHER PUBLICATIONS

Surface & Coatings Technology, "Electrochromics on a roll: Web-coating and lamination for smart windows," by Granqvist et al., vol. 336, pp. 133-138, Aug. 3, 2017.

*Primary Examiner* — Tuyen Tra
(74) *Attorney, Agent, or Firm* — Price Heneveld LLP; Brian James Brewer

(57) ABSTRACT

An electro-optic apparatus configured to adjust in transmittance in response to a control input comprises a first web substrate and a second web substrate. Each of the web substrates form a plurality of perimeter edges. A first edge is in connection with a first electrical terminal connecting in connection with a first electrode. A second edge opposing the first edge is in connection with a second electrical terminal in connection with a second electrode. A third edge and an opposing fourth edge comprise a barrier seal in a first configuration in connection with an exterior surface of each of the first web substrate and the second web substrate. The barrier seal encapsulates the electro-optic medium between an interior surface of each of the first web substrate and the second web substrate.

19 Claims, 22 Drawing Sheets

(58) Field of Classification Search
USPC .......................................... 359/245, 265–275
See application file for complete search history.

(56) References Cited

U.S. PATENT DOCUMENTS

| | | |
|---|---|---|
| 6,020,987 A | 2/2000 | Baumann et al. |
| 6,037,471 A | 3/2000 | Srinivasa et al. |
| 6,045,643 A | 4/2000 | Byker et al. |
| 6,137,620 A | 10/2000 | Guarr et al. |
| 6,141,137 A | 10/2000 | Byker et al. |
| 6,193,912 B1 | 2/2001 | Thieste et al. |
| 6,241,916 B1 | 6/2001 | Claussen et al. |
| 6,249,369 B1 | 6/2001 | Fheiste et al. |
| 6,407,847 B1 * | 6/2002 | Poll ..................... E06B 3/66 359/275 |
| 6,433,913 B1 | 8/2002 | Bauer et al. |
| 6,519,072 B2 | 2/2003 | Nishikitani et al. |
| 10,684,525 B2 * | 6/2020 | Gauthier ................ B23K 26/38 |
| 2002/0075552 A1 | 6/2002 | Poll et al. |
| 2013/0265511 A1 | 10/2013 | Poix et al. |
| 2014/0036338 A1 | 2/2014 | Bareman et al. |
| 2019/0324341 A1 | 10/2019 | Tonar et al. |

FOREIGN PATENT DOCUMENTS

| | | |
|---|---|---|
| WO | 9902621 A1 | 1/1999 |
| WO | 2014134714 A2 | 9/2014 |

* cited by examiner

ELECTRO-OPTIC APPARATUS AND SEAL SYSTEM

CROSS-REFERENCE TO RELATED APPLICATIONS

This application claims priority under 35 U.S.C. § 119(e) and the benefit of U.S. Provisional Application No. 62/776,862 entitled ELECTRO-OPTIC APPARATUS AND SEAL SYSTEM filed on Dec. 7, 2018, by George A. Neuman et al., and 62/835,227 entitled ELECTRO-OPTIC APPARATUS AND SEAL SYSTEM filed on Apr. 17, 2019, by George A. Neuman et al., the entire disclosures of which are incorporated herein by reference.

TECHNOLOGICAL FIELD

The present disclosure generally relates to an element with a variable light transmittance and, more particularly, relates to an electro-optic element configured to change in transmittance in response to an input signal.

SUMMARY

According to one aspect of the disclosure, an electro-optic assembly is disclosed. The assembly comprises comprising a first substrate forming a first surface and a second surface and a second substrate forming a third surface and a fourth surface. The electro-optic assembly comprises a first web substrate adjacent to the second surface and a first electrode formed on a first interior surface of the first web substrate. A second web substrate is adjacent to the third surface and a second electrode is formed on a second interior surface of the second web substrate. An electro-optic medium disposed between the first electrode and the second electrode. Each of the web substrates form a plurality of edges forming a perimeter of the web substrates. The web substrates comprise a first edge portion comprising a first electrical terminal conductively connected to the first electrode; a second edge portion opposing the first edge portion comprising a second electrical terminal conductively connected to the second electrode; and a third edge portion opposing a fourth edge portion. An interior seal extends along each of the plurality of perimeter edges between the first web substrate and the second web substrate.

According to one aspect of the disclosure, a variable transmittance panel is disclosed. The panel comprises a first substrate forming a first surface and a second surface and a second substrate forming a third surface and a fourth surface. The electro-optic assembly is enclosed within a sealed cavity between the first substrate and the second substrate by a first perimeter seal. The electro-optic assembly comprises a first web substrate adjacent to the second surface and a first electrode formed on a first interior surface of the first web substrate. A second web substrate is adjacent to the third surface and a second electrode is formed on a second interior surface of the second web substrate. An electro-optic medium is disposed between the first electrode and the second electrode and each of the web substrates form a plurality of edges forming a perimeter of the web substrates. The plurality of edges comprise a first edge portion in connection with a first electrical terminal in connection with the first electrode and a second edge portion opposing the first edge portion in connection with a second electrical terminal in connection with the second electrode. A third edge portion opposes a fourth edge portion. A second perimeter seal extends along each of the plurality of perimeter edges between the first web substrate and the second web substrate. The second perimeter seal encapsulates the electro-optic medium between the first interior surface and the second interior surface of the first web substrate and the second web substrate.

According to yet another aspect of the disclosure, a variable transmittance panel is disclosed. The panel comprises an exterior assembly configured to encapsulate an electro-optic assembly. The exterior assembly comprises a first substrate, a second substrate forming, and a first perimeter seal forming a sealed cavity between the first substrate and the second substrate. The electro-optic assembly comprises a first web substrate adjacent and a second web substrate disposed in the sealed cavity. A first electrode is formed on a first interior surface of the first web substrate and a second electrode is formed on a second interior surface of the second web substrate. An electro-optic medium is disposed between the first electrode and the second electrode. Each of the web substrates form a plurality of edges forming a perimeter of the web substrates. The plurality of edges comprise a first edge portion in connection with a first electrical terminal in connection with the first electrode. A second edge portion opposes the first edge portion and is in connection with a second electrical terminal in connection with the second electrode. A second perimeter seal extends along each of the plurality of perimeter edges between the first web substrate and the second web substrate.

These and other features, advantages, and objects of the present disclosure will be further understood and appreciated by those skilled in the art by reference to the following specification, claims, and appended drawings.

DETAILED DESCRIPTION OF THE PREFERRED EMBODIMENTS

Figure 1A:
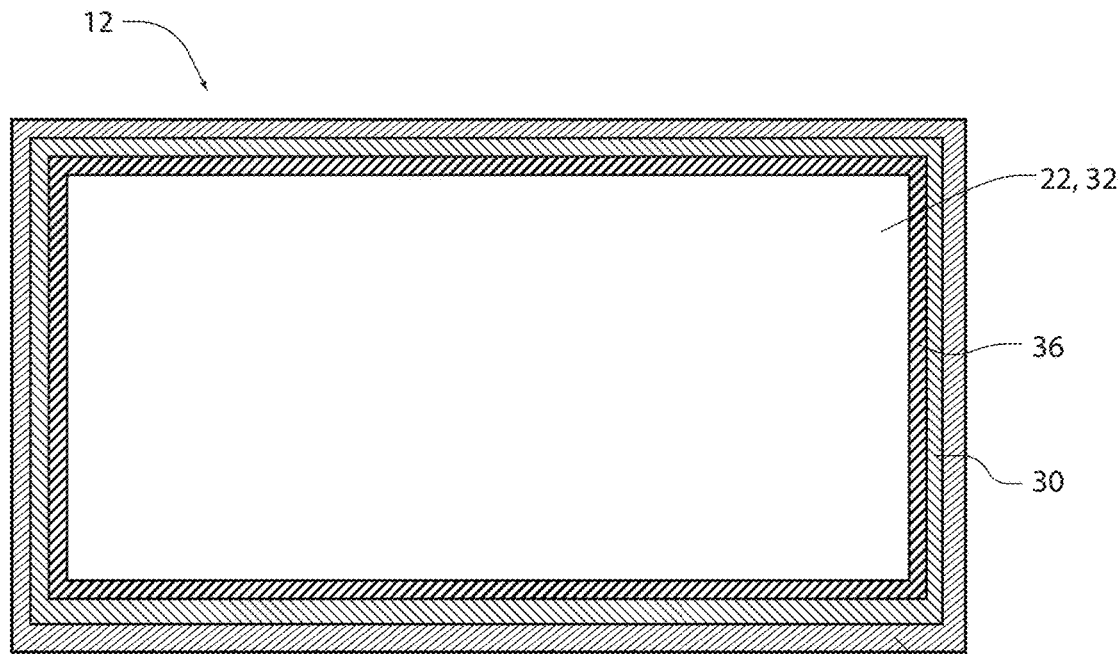
FIG. 1A is a top profile view of an electro-optic element.

Reference will now be made in detail to exemplary embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

Figure 1B:
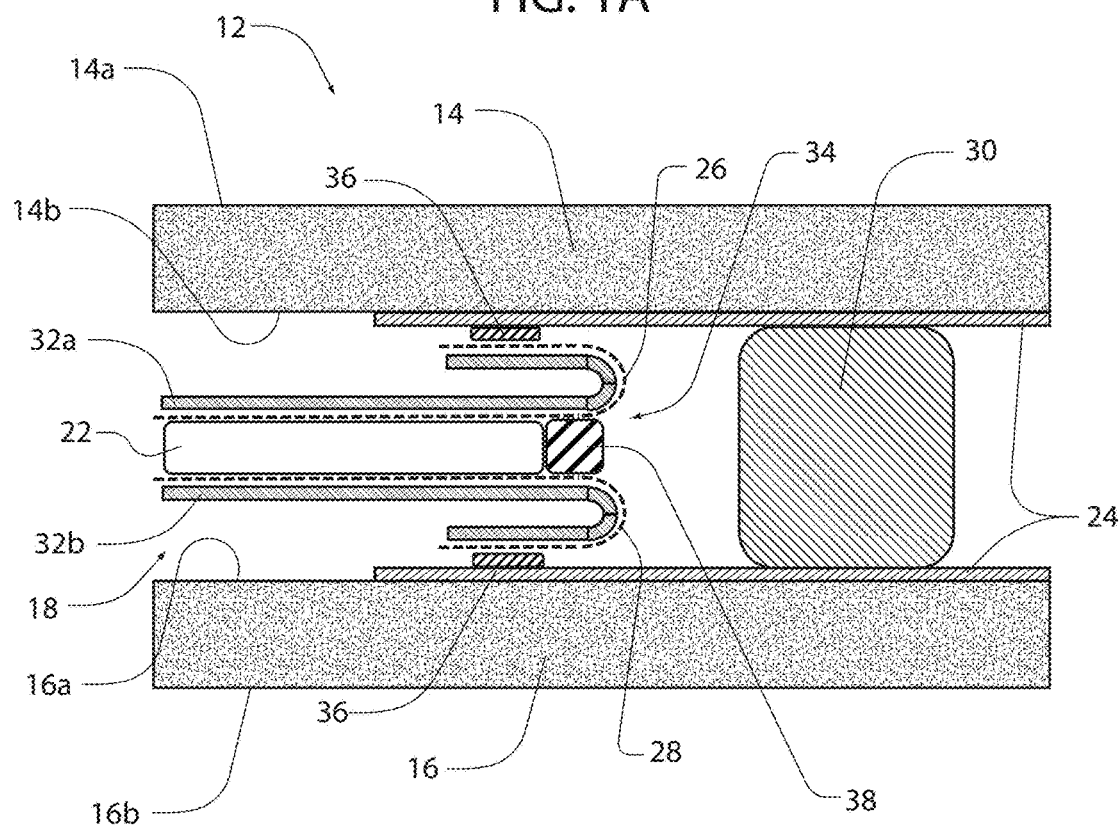
FIG. 1B is a cross-sectional view of an electro-optic element.

Referring now to FIGS. 1A and 1B, an electro-optic element 12 is shown. In various embodiments, the electro-optic element 12 may be implemented in a window, display device, sunroof, lens, and a variety of applications that may benefit from varying a transmittance of light through an at least partially light transmissive element. The embodiments shown in the drawings are depicted with flat substrates. It is understood that the disclosure is not limited to flat substrates. The substrates may be flat, bent, curved, or combinations of these shapes without deviating from the spirit of the disclosure. In various embodiments, the electro-optic element 12 may comprise a first substrate 14 having a first surface 14a and a second surface 14b. The electro-optic element 12 may further comprise a second substrate 16 having a third surface 16a and a fourth surface 16b. The first substrate 14 and the second substrate 16 may define a cavity 18 and may be substantially parallel. Each of the substrates may be of glass or various transparent, rigid substrates that may provide structural support forming the cavity 18.

The cavity 18 may contain an electro-optic medium 22, such as, but not limited to, an electrochromic medium. The cavity 18 may be completely or partially filled with the medium 22. The electro-optic element 12 may be in communication with a dimming controller via a plurality of electrical connections 24. The electrical connections 24 may conductively connect to a first electrode 26 on a first side of the electro-optic medium 22 and a second electrode 28 disposed on a second side of the electro-optic medium 22. The electrodes 26, 28 may be formed by electrically conductive transparent materials, including, but not limited to, a transparent metal oxide (e.g., indium tin oxide, $F:SnO_2$, ZnO, IZO), IMI Structures, carbon (graphene and/or graphite) and/or a conductive metal mesh (e.g. nanowires). The electro-optic element 12 may correspond to an electrochromic element, which may be configured to control a transmittance of light transmitted therethrough in response to a control signal configured to control an electrical potential across the electro-optic medium 22. For example, the electro-optic element 12 may be configured to control a transmittance of light received at the first surface 12a, transmitted through the substrates 12, 14 and the electro-optic medium, and emitted from the fourth surface 14b.

In various examples, the electro-optic medium 22 may include at least one solvent, at least one anodic material, and at least one cathodic material. Typically, both of the anodic and cathodic materials are electroactive and at least one of them is electrochromic. It will be understood that regardless of its ordinary meaning, the term "electroactive" may mean a material that undergoes a modification in its oxidation state upon exposure to a particular electrical potential difference. Additionally, it will be understood that the term "electrochromic" may mean, regardless of its ordinary meaning, a material that exhibits a change in its extinction coefficient at one or more wavelengths upon exposure to a particular electrical potential difference.

Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "ELECTROCHROMIC LAYER AND DEVICES COMPRISING SAME," U.S. Pat. No. 5,998,617 entitled "ELECTROCHROMIC COMPOUNDS," U.S. Pat. No. 6,020,987 entitled "ELECTROCHROMIC MEDIUM CAPABLE OF PRODUCING A PRE-SELECTED COLOR," U.S. Pat. No. 6,037,471 entitled "ELECTROCHROMIC COMPOUNDS," U.S. Pat. No. 6,141,137 entitled "ELECTROCHROMIC MEDIA FOR PRODUCING A PRESELECTED COLOR," U.S. Pat. No. 6,241,916 entitled "ELECTROCHROMIC SYSTEM," U.S. Pat. No. 6,193,912 entitled "NEAR INFRARED-ABSORBING ELECTROCHROMIC COMPOUNDS AND DEVICES COMPRISING SAME," U.S. Pat. No. 6,249,369 entitled "COUPLED ELECTROCHROMIC COMPOUNDS WITH PHOTOSTABLE DICATION OXIDATION STATES," and U.S. Pat. No. 6,137,620 entitled "ELECTROCHROMIC MEDIA WITH CONCENTRATION-ENHANCED STABILITY, PROCESS FOR THE PREPARATION THEREOF AND USE IN ELECTROCHROMIC DEVICES," U.S. Pat. No. 6,519,072 entitled "ELECTROCHROMIC DEVICE"; and International Patent Publication Nos. WO 98/42796 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," and WO 99/02621 entitled "ELECTROCHROMIC POLYMER SYSTEMS," which are herein incorporated by reference in their entirety.

In various embodiments of the electro-optic element 12, care may be taken to prevent infiltration of contaminants in the cavity 18 while effectively connecting electrical connections 24 configured to communicate the control signals from the control circuit to the electro-optic medium 22. For example, the electro-optic element 12 may comprise various seals (e.g. a primary seal 30 or exterior seal) configured to isolate the cavity 18 from an external environment and prevent infiltration of contaminants. Accordingly, the design and manufacture of the electro-optic element 12 may require a number of considerations in order to prevent one or more contaminants (e.g. oxygen, water, etc.) from infiltrating the substrates 12, 14 and various seals that may be configured to seal the cavity from an environment proximate the element 12. As discussed herein, the seals may be implemented by a variety of materials that may adhere to the substrates including but not limited to silicone, epoxy, acrylic, urethane, etc.

In various embodiments, the disclosure may provide for improvements in the design of the electro-optic element 12 introduced in reference to FIG. 1. The novel configurations and structures discussed herein provide for both ease of conductive connection of the electrical connections 24 to the electro-optic element 12 while restricting infiltration of foreign materials, such as oxygen, water, or other species that may be incompatible with the electrochromic medium 22. In various embodiments, the electrical connections 24 may be implemented as coatings that may be disposed on rigid structures (e.g. glass) forming the substrates 12, 14. Additionally, the electrical connections 24 may comprise one or more seals formed by conductive material. As further discussed in the following exemplary embodiments, the disclosure may provide for a variety of configurations that may improve the ease of manufacture, longevity, and/or value of the electro-optic element 12. In reference to the various figures and embodiments, like reference numerals may be utilized to refer to similar components and assemblies as discussed herein for clarity. Additionally, various elements introduced in each of the assemblies provided herein may be combined in a variety of ways as may be apparent to those skilled in the art.

Still referring to FIGS. 1A and 1B, in an exemplary embodiment, the electro-optic element 12 may comprise a first web substrate 32a and a second web substrate 32b. The first electrode 26 may be disposed on an interior surface of the first web substrate 32a, and the second electrode 28 may be disposed on an interior surface of the second web substrate 32b. As shown in FIG. 1B, each of the web substrates 32 may fold over proximate about a perimeter edge 34 of the electro-optic element 12 such that the first electrode 26 and the second electrode 28 are directed outward toward the second surface 12b and the third surface 14a, respectively. In this configuration, the electrodes 26, 28 may conductively connect to the electrical connections 24, which may be formed as thin layers on the second surface 12b and the third surface 14a, via electrical terminals 36.

The web substrates 32 as discussed herein may be implemented by a variety of materials to suit various applications and corresponding performance characteristics. For example, the first web substrate 32a and/or the second web substrate 32b may be composed of a polymeric material, a glass, a glass-ceramic and/or combinations thereof. It will be understood that the first web substrate 32a and the second web substrate 32b may include the same type of material (i.e., both polymeric material) or that the material type may be different (i.e., one of the first and second substrates 32a, 32b includes a polymeric material and the other a glass). The first and/or second web substrates 32a, 32b may be substantially transparent. In polymeric examples, the polymeric material of the first and/or second substrates 32a, 32b may include polyethylene (e.g., low and/or high density), polyethylene terephthalate (PET), polyethylene naphthalate (PEN), polycarbonate (PC), other polymeric materials and/or combinations thereof. It will be understood that the first and second substrates 32a, 32b may have the same or a different compositions as one another. Where both the first and second substrates 32a, 32b include a polymeric material, the substrates 32a, 32b may be flexible or rigid such that the electro-optic element 12 formed therefrom is a flexible or rigid electro-optic element 12. Further examples of the electro-optic element 12 and the substrates 32 are discussed in U.S. Patent Publication No. 2019/0324341 A1, the disclosure of which is incorporated herein by reference in its entirety.

Electrical connections 24 may comprise a metal, alloy, TCO, compound or other material which provided adequate electrical conductivity from the exterior of the device to the interior. The conductivity necessary may vary with the application. The electrical connections, as shown in FIG. 1A, may transverse the entire perimeter edge 34 thus minimizing the electrical potential drop to the various locations in the electrochromic media. Electrical connections to the control circuitry may be made along a suitable location at the perimeter of the device (not shown) using standard electrical connection methods. Electrical terminals 36 provide transfer of electricity between electrical connections along with optional bonding to the transparent electrodes 26 and 28 and electrical connection 24. Accordingly, the electrical terminals 36 may correspond to electrical buses and may be formed of various conductive metals or conductive polymers (e.g. foils, conductive epoxies, etc.).

In some instances, the electrical terminals 36 may transverse the entire perimeter of the assembly or may be localized to one or more discrete locations in the device depending on the application. Additionally, the first web substrate 32a and the second web substrate 32b may be sealed together by a secondary seal 38 or interior barrier seal in a separated or spaced configuration thereby enclosing the electro-optic medium 22 and separating the first electrode 26 from the second electrode 28. As discussed herein, a perimeter may correspond to a boundary or outermost edge of a body or structure. Accordingly, the perimeter of the web substrates 32 may be formed by a plurality of edges defining the boundary or termination of the web substrates 32. Additionally, edge portions of the web substrates 32 may extend over the inner surfaces of the web substrates 32 directed toward the electro-optic medium 22 and outer surfaces of the web substrates 32 directed toward the substrates 14, 16. Accordingly, the edge portions may include a region proximate to the perimeter of the web substrates 32.

As discussed herein, the web substrates 32 may correspond to flexible substrates having conductive material of the electrodes 26, 28 applied as coatings to their interior surfaces. The electrodes 26 and 28 may comprise various conductive materials, including, but not limited to, indium tin oxide (ITO), indium zinc oxide (IZO), or various conductive coatings, such as IMI coatings. In this way, the electrical potential across the electro-optic medium 22 may be achieved between the interior surfaces of the web substrates 32 via the electrodes 26 and 28. Additionally, in some embodiments, the web substrates 32 may be laminated to the first substrate 14 and the second substrate 16 such that the rigid materials forming the substrate 14, 16 supports the web substrates 32. The web substrates 32 may be laminated to the first substrate 14 and the second substrate 16 by laminating materials, including, but not limited to, Polyvinyl Butyra I (PVB), Ethylene Vinyl Acetate (EVA), Polyurethane (PU), or similar materials. It is understood that in FIG. 1B, and different embodiments shown in the other figures, the laminating material may occupy some or all of the space between the substrates 14 and 32*a* and 16 and 32*b* not occupied by other components.

Figure 2A:
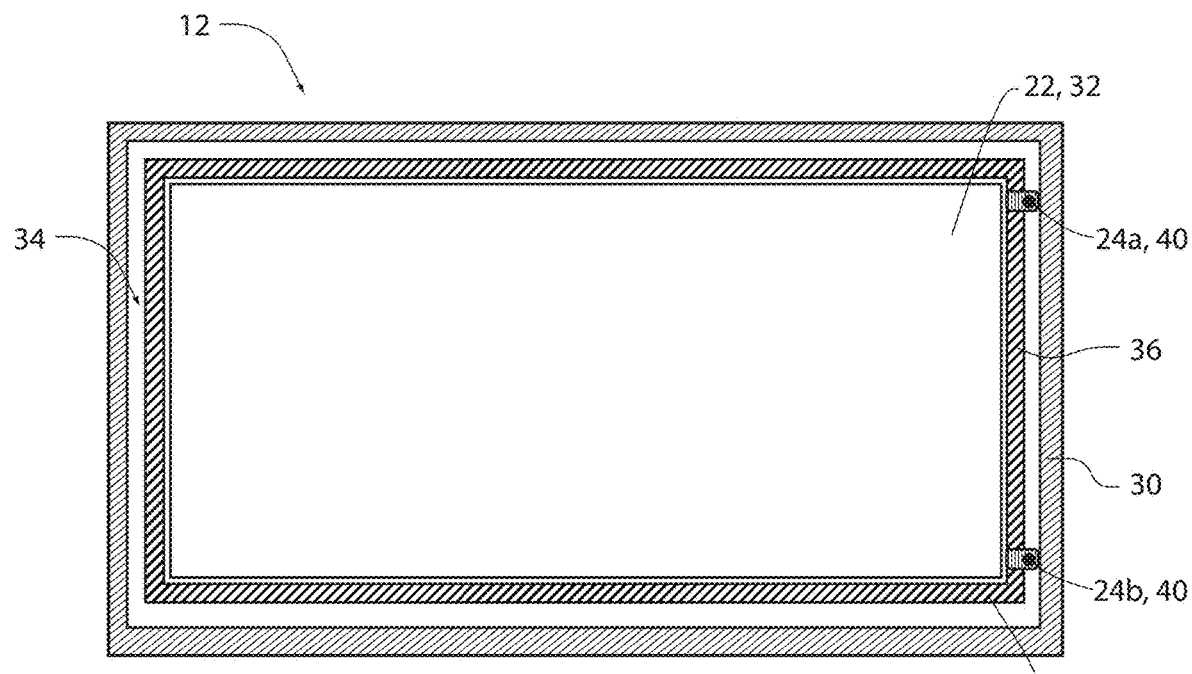
FIG. 2A is a top profile view of an electro-optic element.
Figure 2B:
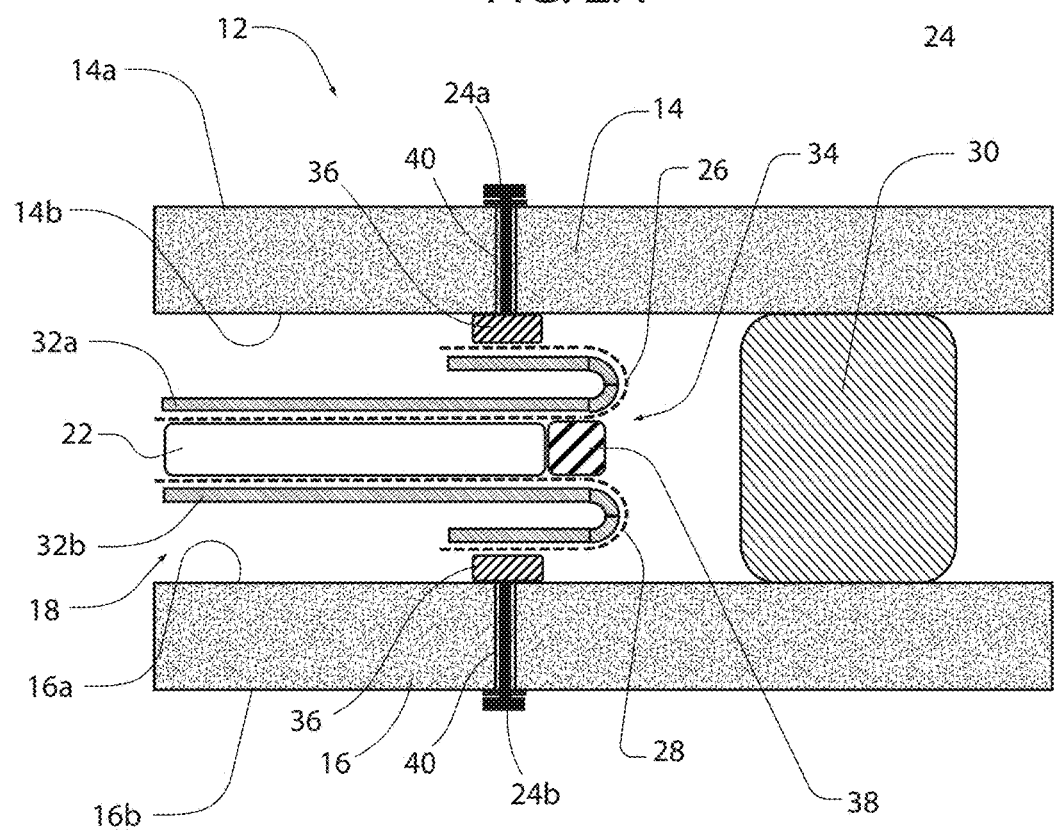
FIG. 2B is a cross-sectional view of an electro-optic element.

Referring now to FIGS. 2A and 2B, the electro-optic element 12 may comprise the first web substrate 32*a* and the second web substrate 32*b*. The first electrode 26 may be disposed on an interior surface of the first web substrate 32*a* and the second electrode 28 may be disposed on an interior surface of the second web substrate 32*b*. As shown in FIG. 2B, each of the web substrates 32 may fold over proximate about a perimeter edge 34 of the electro-optic element 12 such that the first electrode 26 and the second electrode 28 are directed outward toward the second surface 12*b* and the third surface 14*a*, respectively. In this configuration, the electrodes 26, 28 may conductively connect to the electrical connections 24 via electrical terminals 36. As shown, the electrical connections may be formed through port holes 40 through the first substrate 14 and the second substrate 16. In this configuration, the electrical connections 24 may pass through the port holes 40 in the substrates 14 and 16 such that the electrical connections are exposed on the first surface 14*a* and the fourth surface 16*b* for connection to a control circuit. Additionally, the first web substrate 32*a* and the second web substrate 32*b* may be sealed together by a secondary seal 38 or interior barrier seal in a separated or spaced configuration thereby enclosing the electro-optic medium 22 and separating the first electrode from the second electrode 28.

Figure 3A:
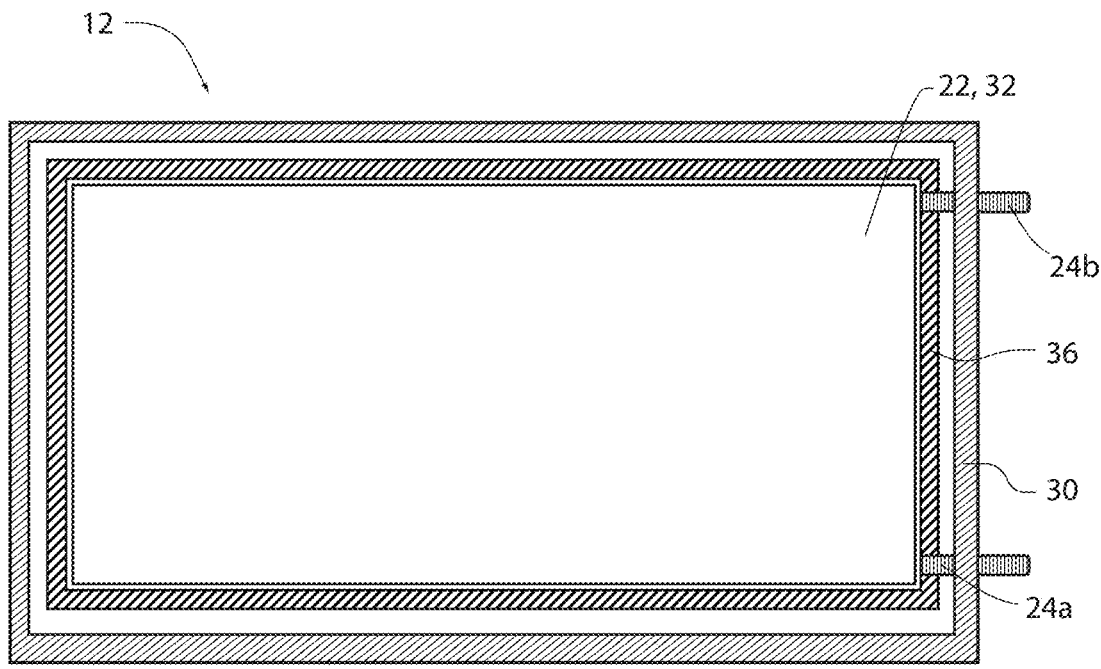
FIG. 3A is a top profile view of an electro-optic element.
Figure 3B:
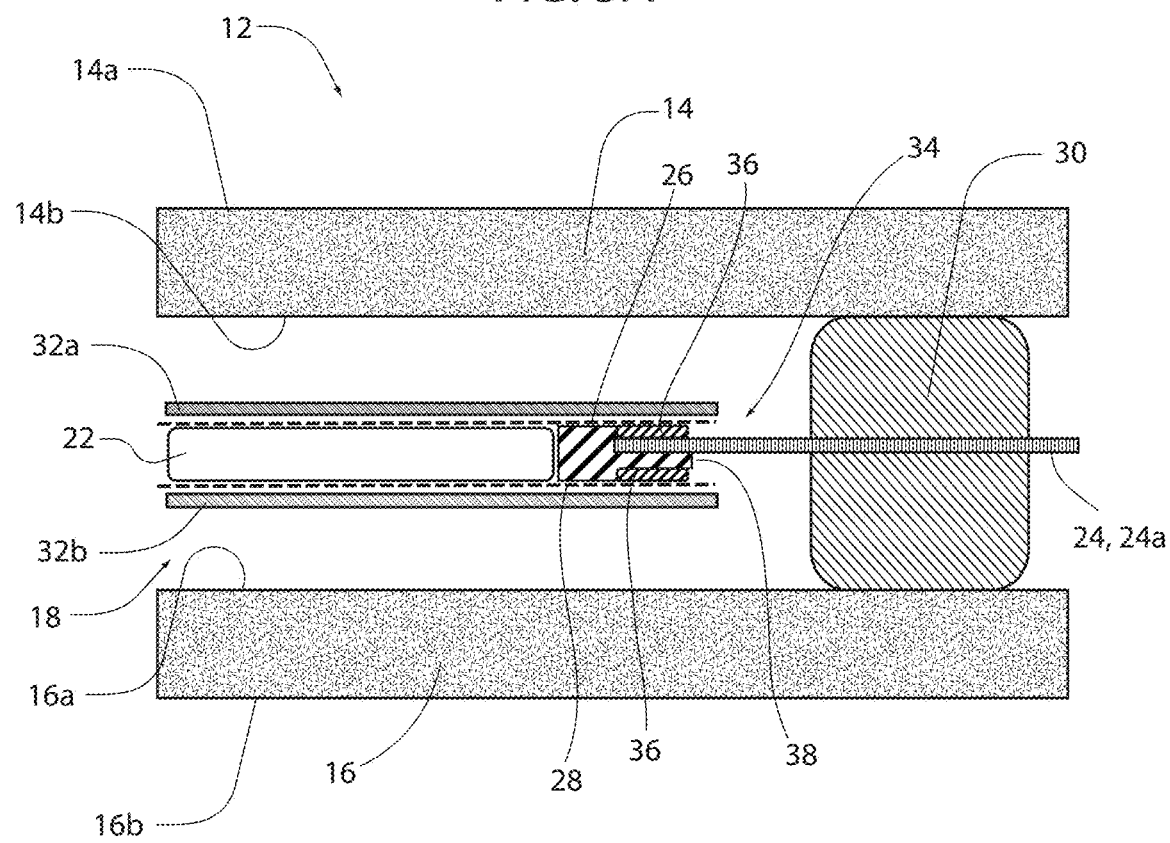
FIG. 3B is a cross-sectional view of an electro-optic element.

Referring now to FIGS. 3A and 3B, the electro-optic element 12 may comprise the first web substrate 32*a* and the second web substrate 32*b*. The first electrode 26 may be disposed on an interior surface of the first web substrate 32*a* and the second electrode 28 may be disposed on an interior surface of the second web substrate 32*b*. The web substrates 32 may extend substantially parallel to the first substrate 14 and the second substrate 16 terminating proximate to the perimeter edge 34 of the electro-optic element 12. In this configuration, the electrodes 26, 28 may conductively connect to a first electrical connection 24*a* and a second electrical connection 24*b*, which may extend through the primary seal 30. Each of the electrical connections 24 may be conductively connected to the first electrode 26 and the second electrode 28 via the electrical terminals 36, which may be disposed between the first electrode 26 and the second electrode 28. Electrical connections and bonding between the electrodes 26 and 28 and electrical terminal 24 may occur by various bonding means (not shown in figures) known in the art such as soldering, electrically conductive adhesive, etc. Similar bonding means may be employed in other areas of the device that require bonding and electrical connectivity such as, but not limited to, bus 72 to electrical terminal 24, insulating conductor 100 and conductive lead 102, conductive lead 102 and electrical terminal 24, conductive connector 112 and electrical terminal 24, or similar situations. Additionally, the secondary seal 38 may separate the first electrode 26 and the second electrode 28 while additionally sealing the first web substrate 32*a* and the second web substrate 32*b* in a separated or spaced configuration thereby enclosing the electro-optic medium 22. In FIG. 3 and similar figures, there is space or gap shown between the electro optic media 22 and the bus 36 and seal 38 or barrier seal components. It should be understood that this gap is present to help illustrate the different components of the system. In practice, the gap may be present or absent and, if absent, occupied by electro optic media 22 or seal 38.

Figure 3C:
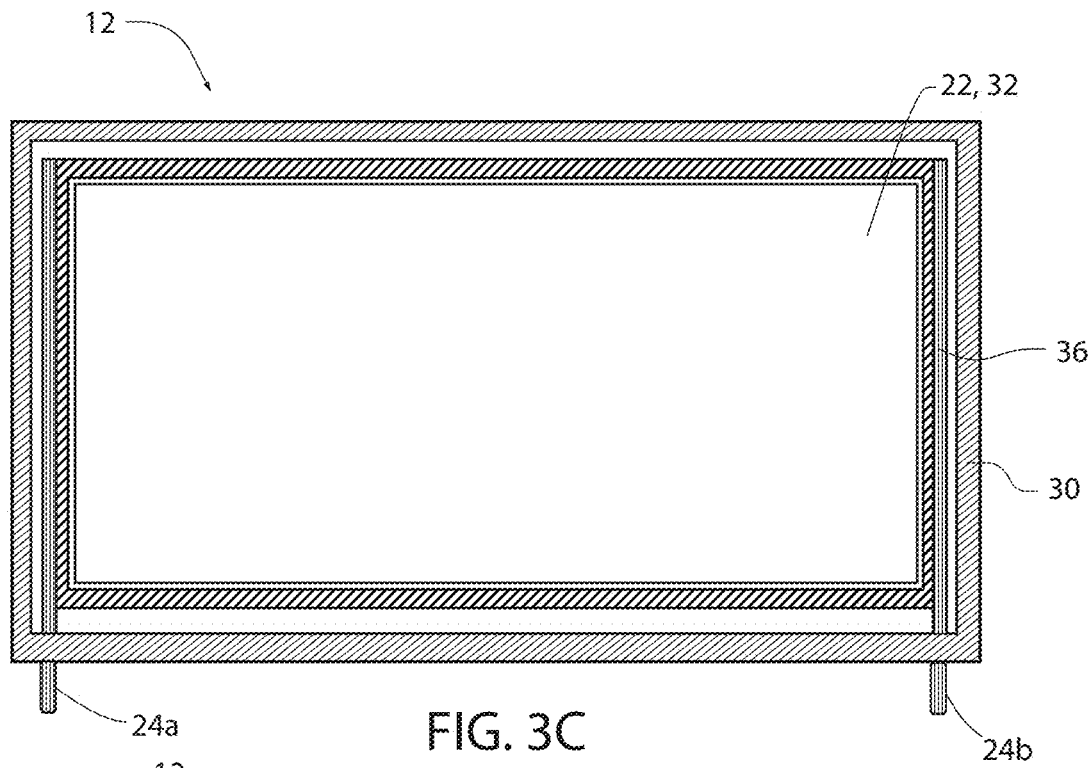
FIG. 3C is a top profile view of an electro-optic element.
Figure 3D:
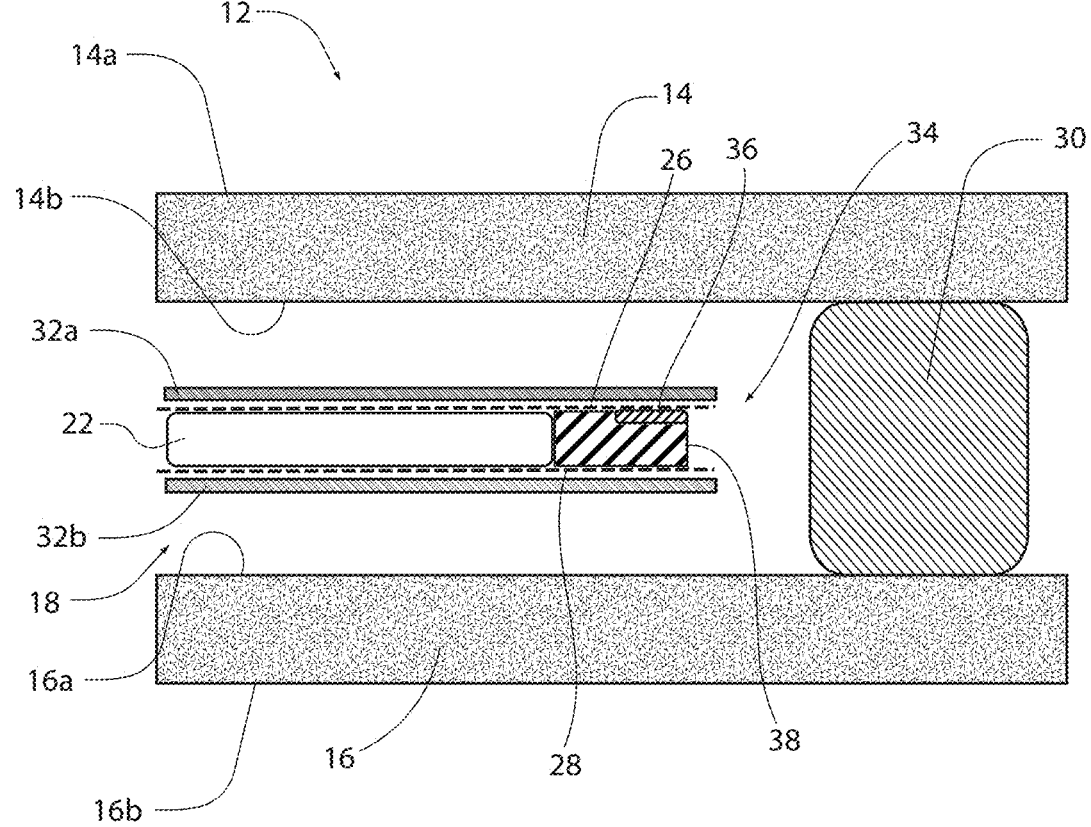
FIG. 3D is a cross-sectional view of an electro-optic element.
Figure 3E:
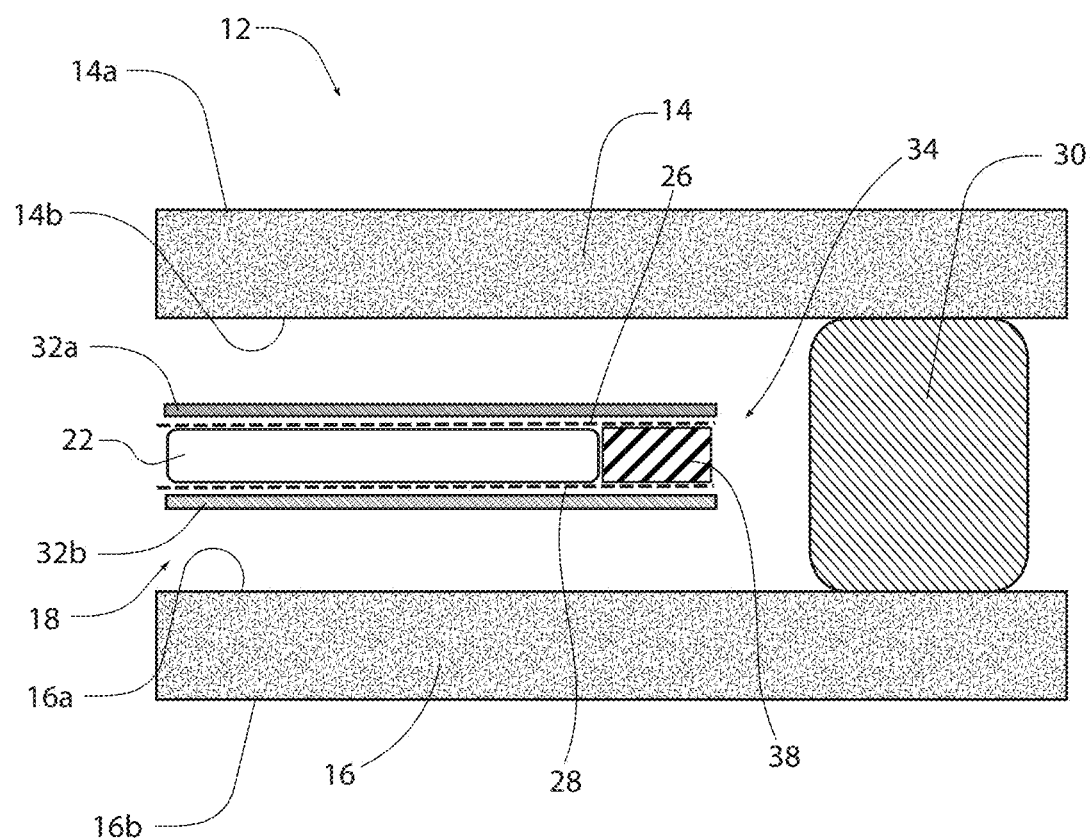
FIG. 3E is a cross-sectional view of an electro-optic element.

Referring now to FIGS. 3C, 3D, and 3E, a variation of the construction depicted in FIGS. 3A and 3B is shown comprising the electrical terminals 36 extending along opposing sides of the electro-optic element 12. As depicted in FIG. 3D, the electrical terminals 36 are in conductive connection with each of the first electrode 26 disposed on the first web substrate 32*a* and the second electrode 28 disposed on the second web substrate 32*b*. As previously discussed, the first electrode 26 and the second electrode 28 may be disposed on interior surfaces of the first web substrate 32*a* and the second web substrate 32*b*, respectively. In this configuration, the electrodes 26, 28 may conductively connect to a first electrical connection 24*a* and a second electrical connection 24*b*, which may extend through the primary seal 30 in a similar configuration to that depicted in FIG. 3B. In this configuration, the electrical terminals may act as electrically conductive buses, or structures configured to distribute the electrical charge at each of the electrical connections 24 along opposing sides of the perimeter edge 34 of the electro-optic element 12.

Figure 4A:
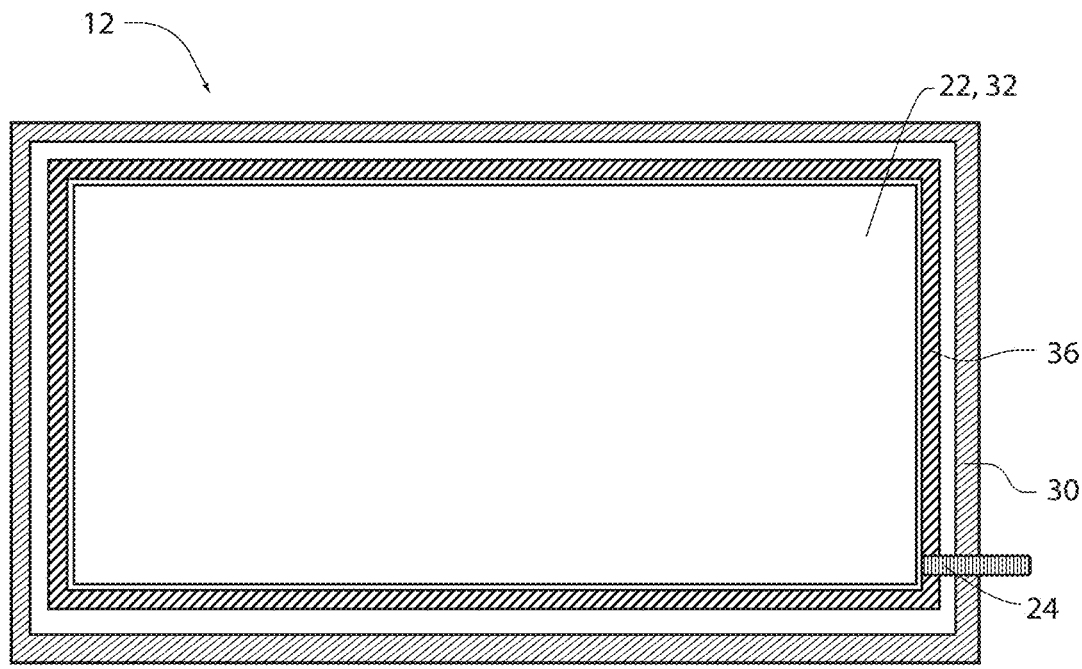
FIG. 4A is a top profile view of an electro-optic element.
Figure 4B:
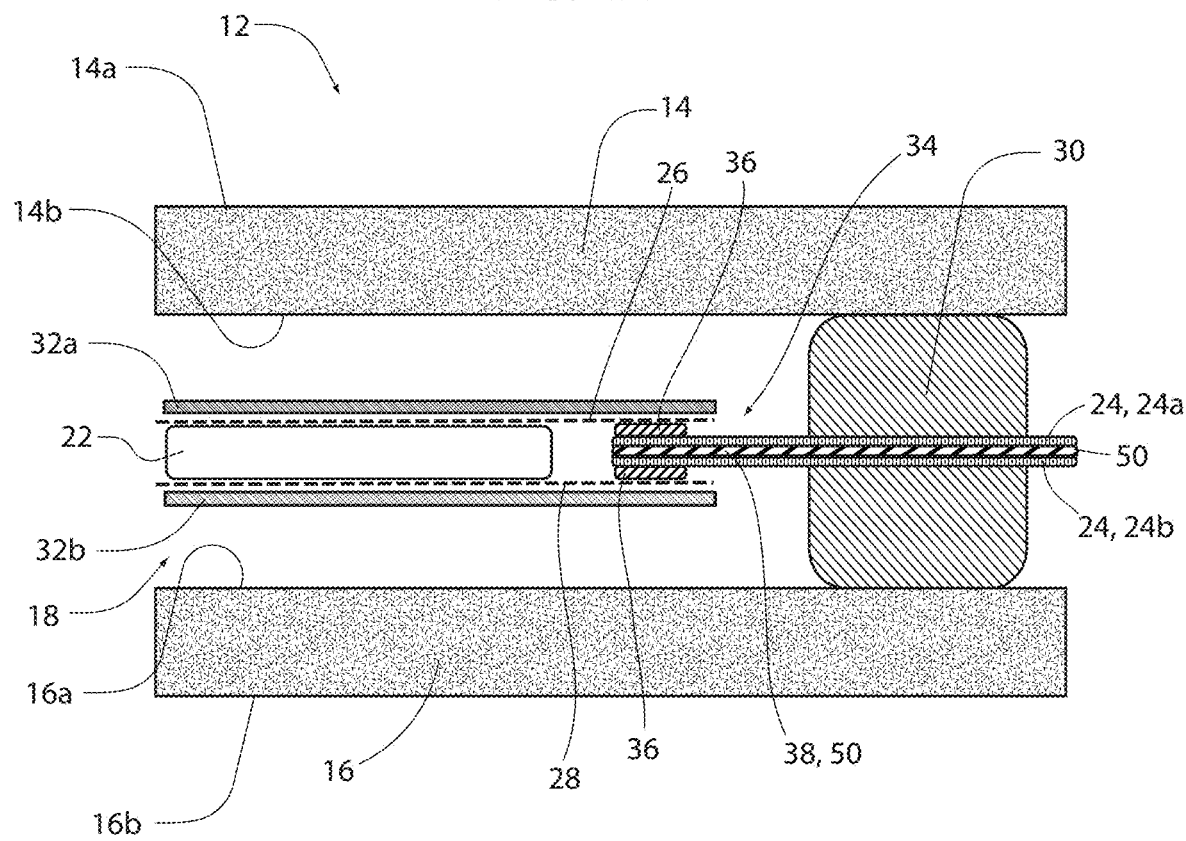
FIG. 4B is a cross-sectional view of an electro-optic element.

Referring now to FIGS. 4A and 4B, the electro-optic element 12 may comprise the first web substrate 32*a* and the second web substrate 32*b*. The first electrode 26 may be disposed on an interior surface of the first web substrate 32*a*, and the second electrode 28 may be disposed on an interior surface of the second web substrate 32*b*. The web substrates 32 may extend substantially parallel to the first substrate 14 and the second substrate terminating proximate to the perimeter edge 34 of the electro-optic element 12. In this configuration, the electrodes 26, 28 may conductively connect to a first electrical connection 24*a* and the second electrical connection 24*b*, which may extend through the primary seal 30 or exterior seal. Each of the electrical connections 24 may be conductively connected to the first electrode 26 and the second electrode 28 via the electrical terminals 36, which may be disposed between the first electrode 26 and the second electrode 28. The first electrical connection 24*a* and the second electrical connection 24*b* may be separated by a dielectric layer 50, which may insulate the first electrical connection 24*a* from the second electrical connection 24*b*. The secondary seal 38 may form a portion or be combined with the dielectric layer thereby separating the first electrode 26 and the second electrode 28 while additionally sealing the first web substrate 32*a* and the second web substrate 32*b*.

Figure 5A:
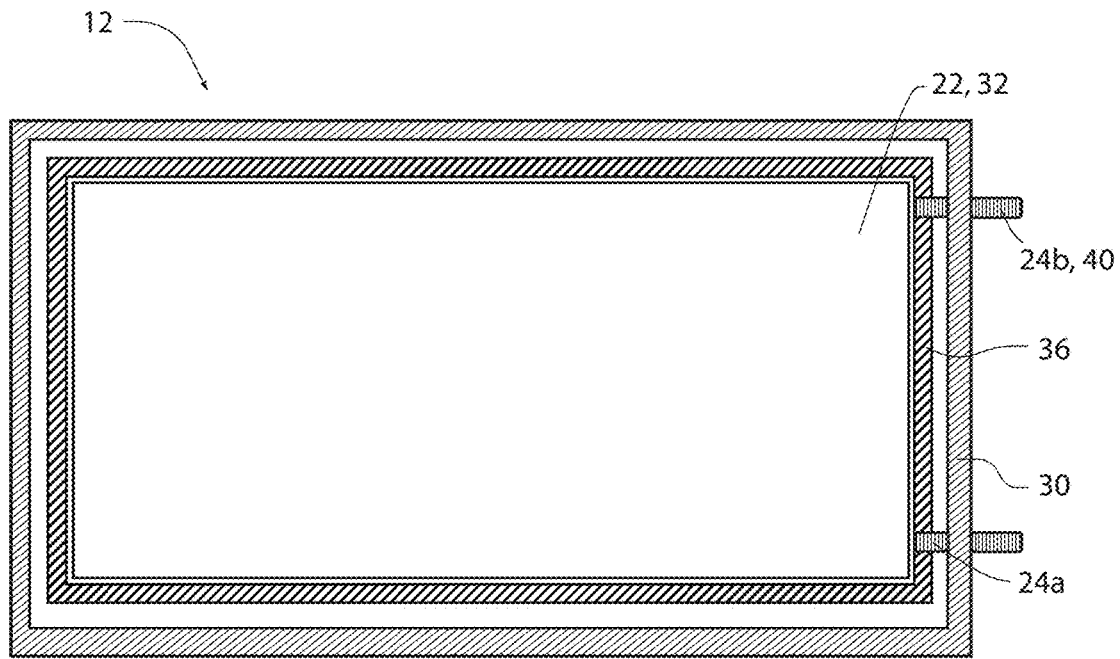
FIG. 5A is a top profile view of an electro-optic element.
Figure 5B:
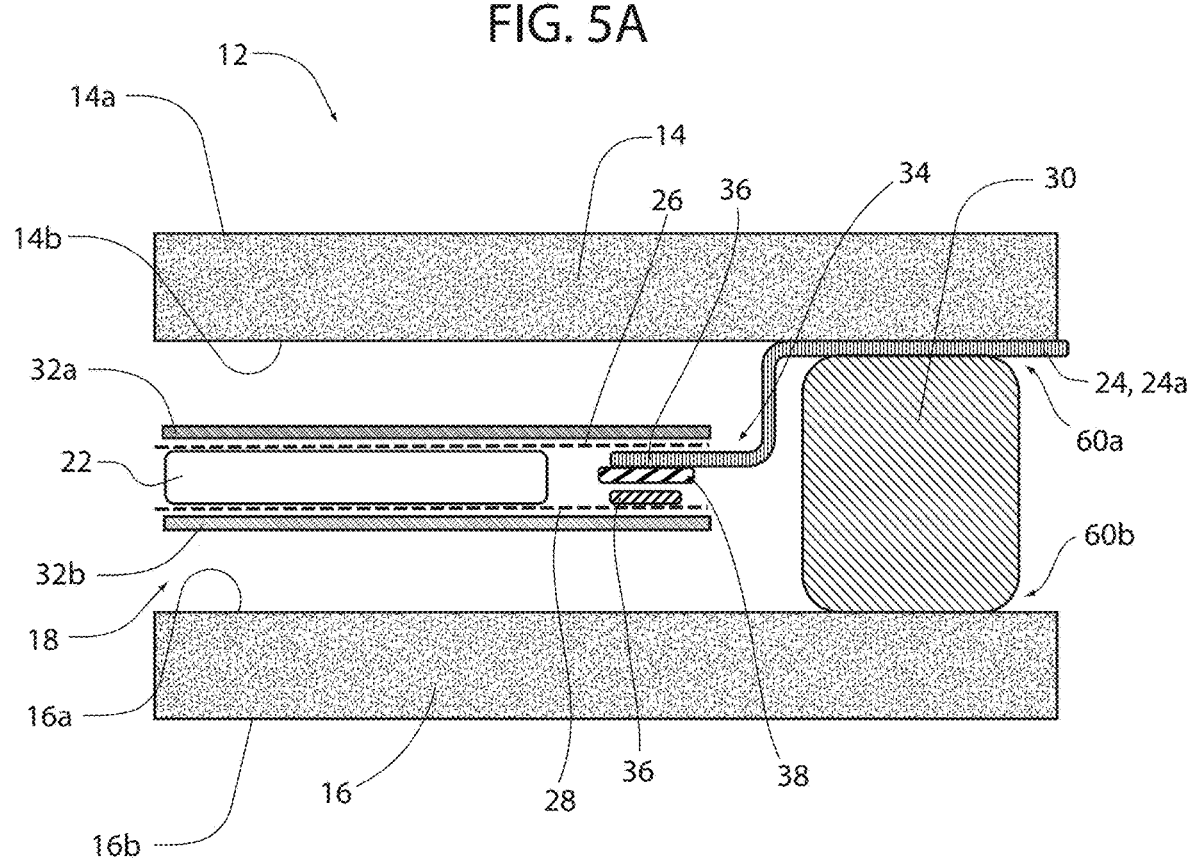
FIG. 5B is a cross-sectional view of an electro-optic element.

Referring now to FIGS. 5A and 5B, the electro-optic element 12 may comprise the first web substrate 32*a* and the second web substrate 32*b*. The first electrode 26 may be disposed on an interior surface of the first web substrate 32*a*, and the second electrode 28 may be disposed on an interior surface of the second web substrate 32*b*. The web substrates 32 may extend substantially parallel to the first substrate 14 and the second substrate terminating proximate to the perimeter edge 34 of the electro-optic element 12. In this configuration, the electrodes 26, 28 may conductively connect to the first electrical connection 24*a* and the second electrical connection 24*b*. The first electrical connection 24*a* may extend along a first side 60*a* of the primary seal 30 and the second electrical connection 24*b* may extend along a second side 60*b* of the primary seal 30. In this way, the primary seal 30 or exterior seal may seal the cavity 18 and separate the first electrical connection 24*a* from the second electrical connection 24*b*. Each of the electrical connections 24 may be conductively connected to the first electrode 26 and the second electrode 28 via the electrical terminals 36, which may be disposed between the first electrode 26 and the second electrode 28. Additionally, the secondary seal 38 may separate the first electrode 26 and the second electrode 28 while additionally sealing the first web substrate 32*a* and a second web substrate 32*b* in a separated or spaced configuration thereby enclosing the electro-optic medium 22.

Figure 6A:
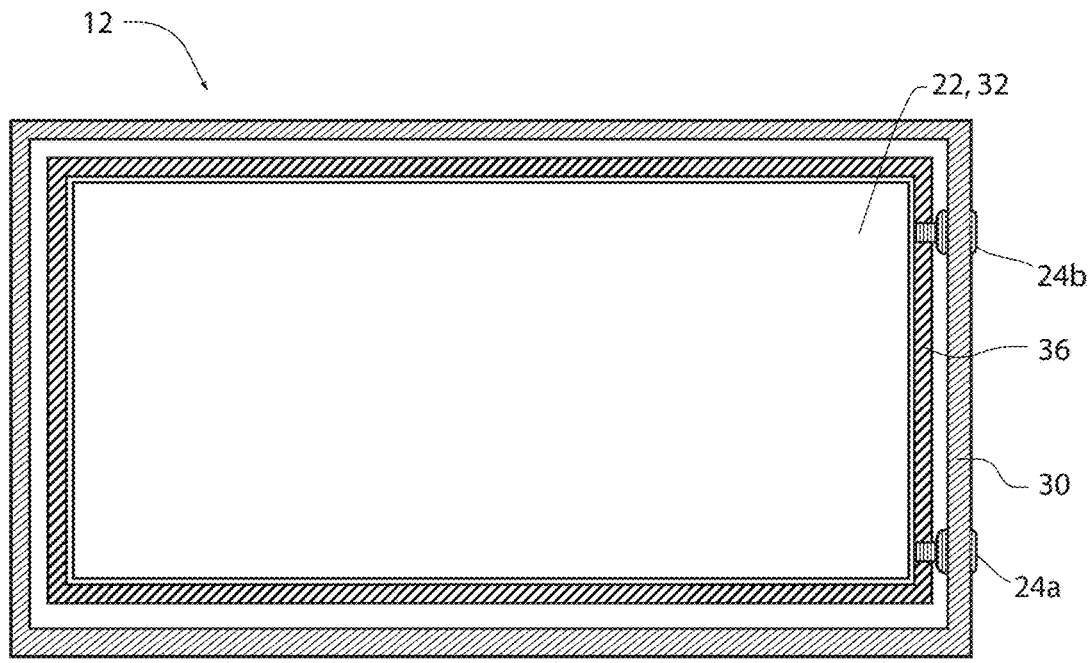
FIG. 6A is a top profile view of an electro-optic element.
Figure 6B:
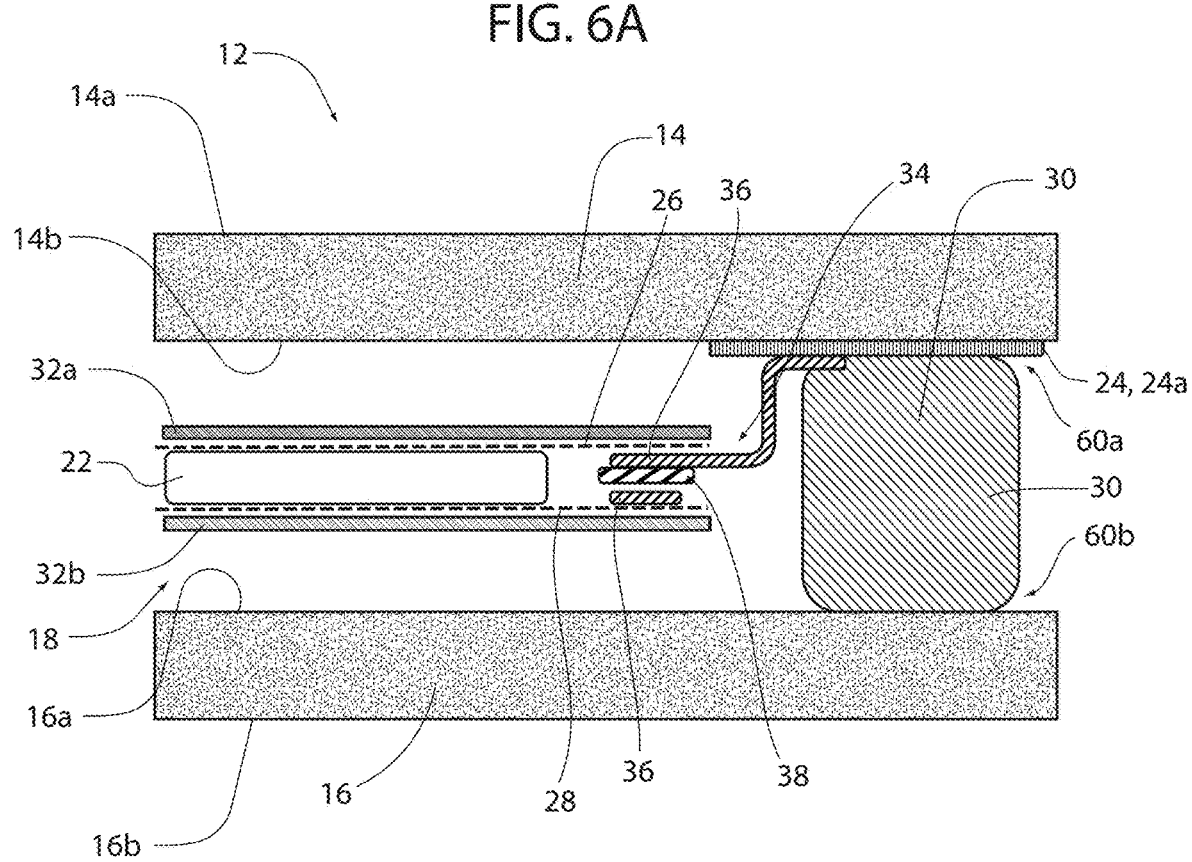
FIG. 6B is a cross-sectional view of an electro-optic element.

Referring now to FIGS. 6A and 6B, the electro-optic element 12 may comprise the first web substrate 32*a* and the second web substrate 32*b*. The first electrode 26 may be disposed on an interior surface of the first web substrate 32*a*, and the second electrode 28 may be disposed on an interior surface of the second web substrate 32*b*. The web substrates 32 may extend substantially parallel to the first substrate 14 and the second substrate terminating proximate to the perimeter edge 34 of the electro-optic element 12. In this configuration, the electrodes 26, 28 may conductively connect to the first electrical connection 24*a* and the second electrical connection 24*b*. The first electrical connection 24*a* may extend proximate to the first side 60*a* of the primary seal 30 and the second electrical connection 24*b* may extend proximate to the second side 60*b* of the primary seal 30.

Each of the first electrical connection 24*a* and the second electrical connection 24*b* may conductively connect to the thin conductive layers on the second surface 12*b* and the third surface 14*a*, via electrical terminals 36 within the cavity 18. The thin conductive layers may be formed of various conductive materials that may not interfere with the connection of the primary seal 30 to the substrates 14 and 16, for example, conductive epoxy or thin film. In this way, the primary seal 30 may seal the cavity 18 and separate the first electrical connection 24*a* from the second electrical connection 24*b*. Each of the electrical connections 24 may be conductively connected to the first electrode 26 and the second electrode 28 via the electrical terminals 36, which may be disposed between the first electrode 26 and the second electrode 28. Additionally, the secondary seal 38 or interior barrier seal may separate the first electrode 26 and the second electrode 28 while additionally sealing the first web substrate 32*a* and a second web substrate 32*b* in a separated or spaced configuration thereby enclosing the electro-optic medium 22.

As demonstrated in FIGS. 7-9, the first web substrate 32*a* may extend outward further than the second web substrate 32*b* along the perimeter edge 34 of the electro-optic element 12 on a first side 70*a*. Additionally, the second web substrate 32*b* may extend outward further than the first web substrate 32*a* along the perimeter edge 34 of the electro-optic element 12 on a second side 70*b*. In this configuration, the electro-optic element 12 may include the first electrical connection 24*a* and the second electrical connection 24*b* comprising a first bus bar 72*a* and a second bus bar 72*b*, respectively. The first bus bar 72*a* may extend along the interior surface of the first web substrate 32*a* on the first side 70*a* and the second bus bar 72*b* may extend along the interior surface of the second web substrate 32*b* on the second side 70*b*. In this configuration, the web substrates 32 may be offset providing for each of the bus bars to be exposed for connection to the electrical connections 24.

Figure 7A:
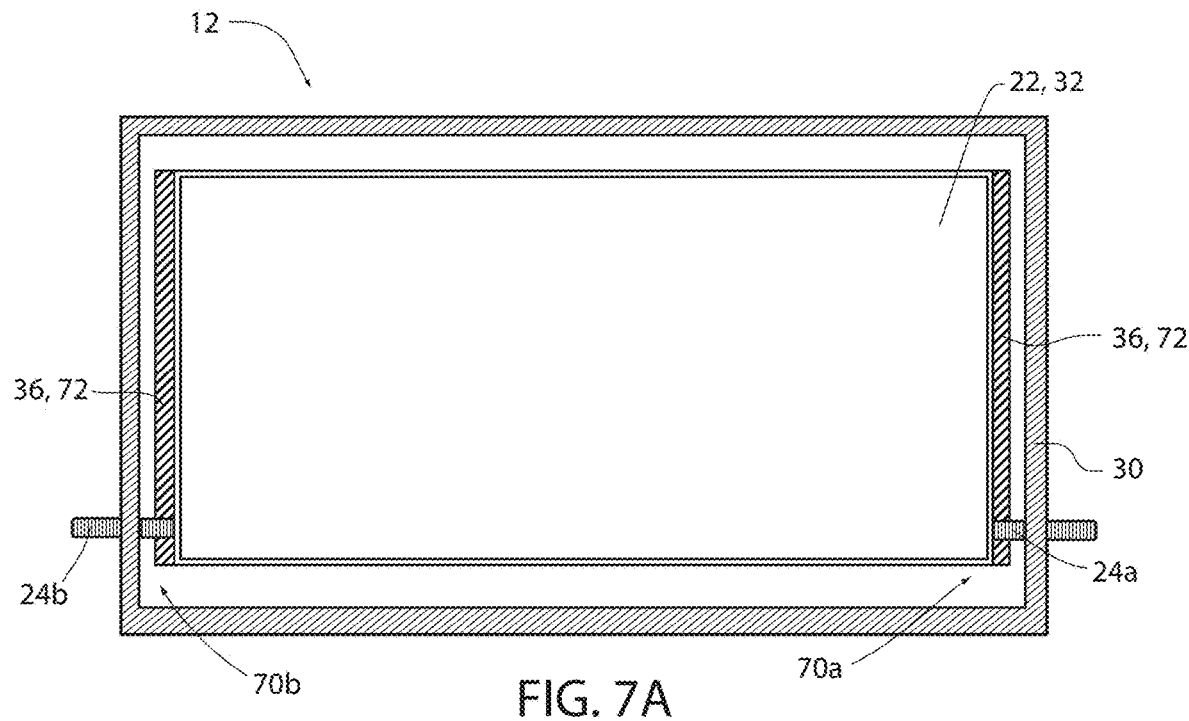
FIG. 7A is a top profile view of an electro-optic element.
Figure 7B:
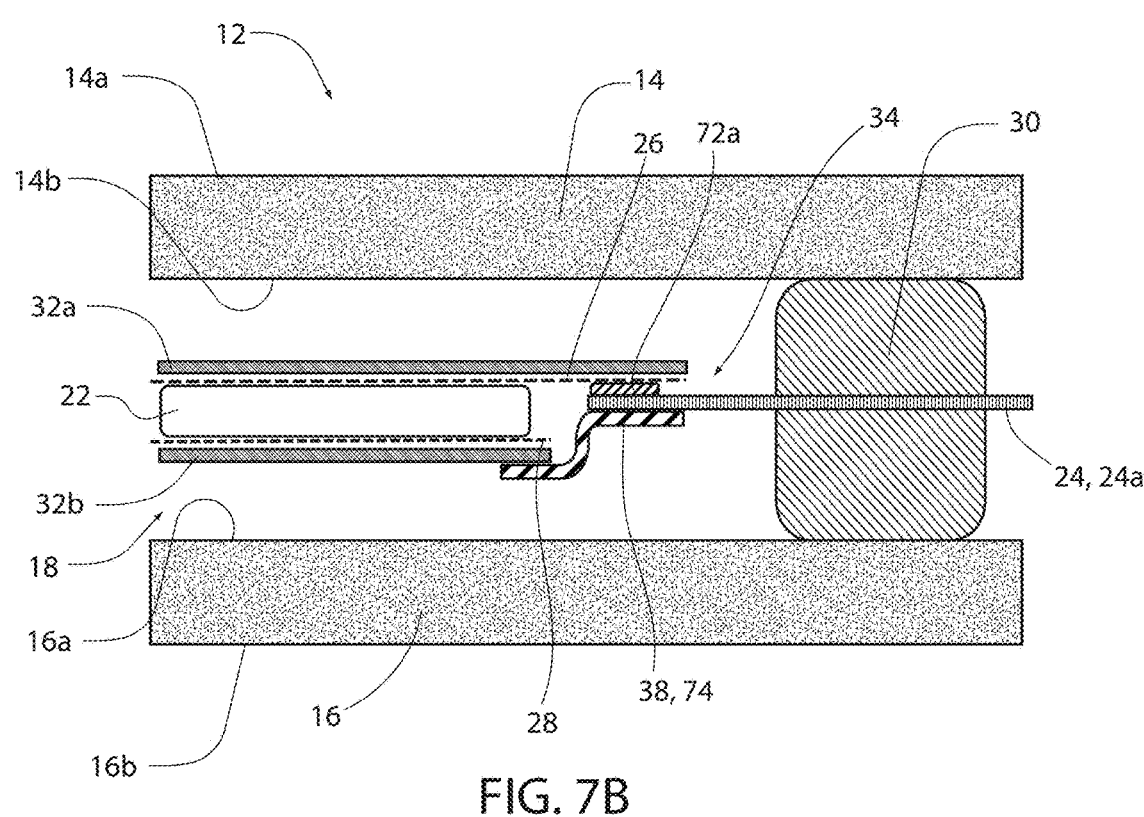
FIG. 7B is a cross-sectional view of an electro-optic element.

Referring now to FIGS. 7A and 7B, the first electrode 26 may be disposed on the interior surface of the first web substrate 32*a*, and the second electrode 28 may be disposed on the interior surface of the second web substrate 32*b*. The electrodes 26, 28 may conductively connect to the first bus bar 72*a* and the second bus bar 72*b* on the first side 70*a* and the second side 70*b*, respectively. Additionally, the first electrical connection 24*a* and the second electrical connection 24*b* may extend through the primary seal 30. Additionally, the secondary seal 38 may correspond to a flexible perimeter seal 74 configured to seal the perimeter edge 34 of the web substrates 32.

Figure 8A:
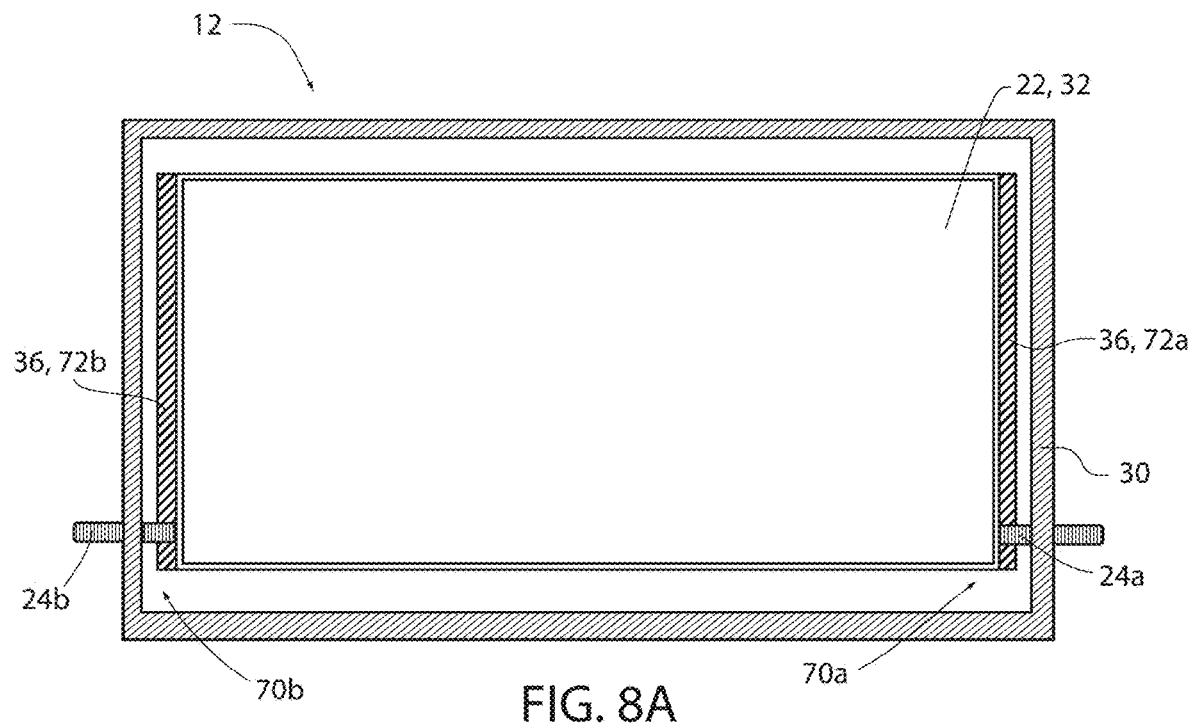
FIG. 8A is a top profile view of an electro-optic element.
Figure 8B:
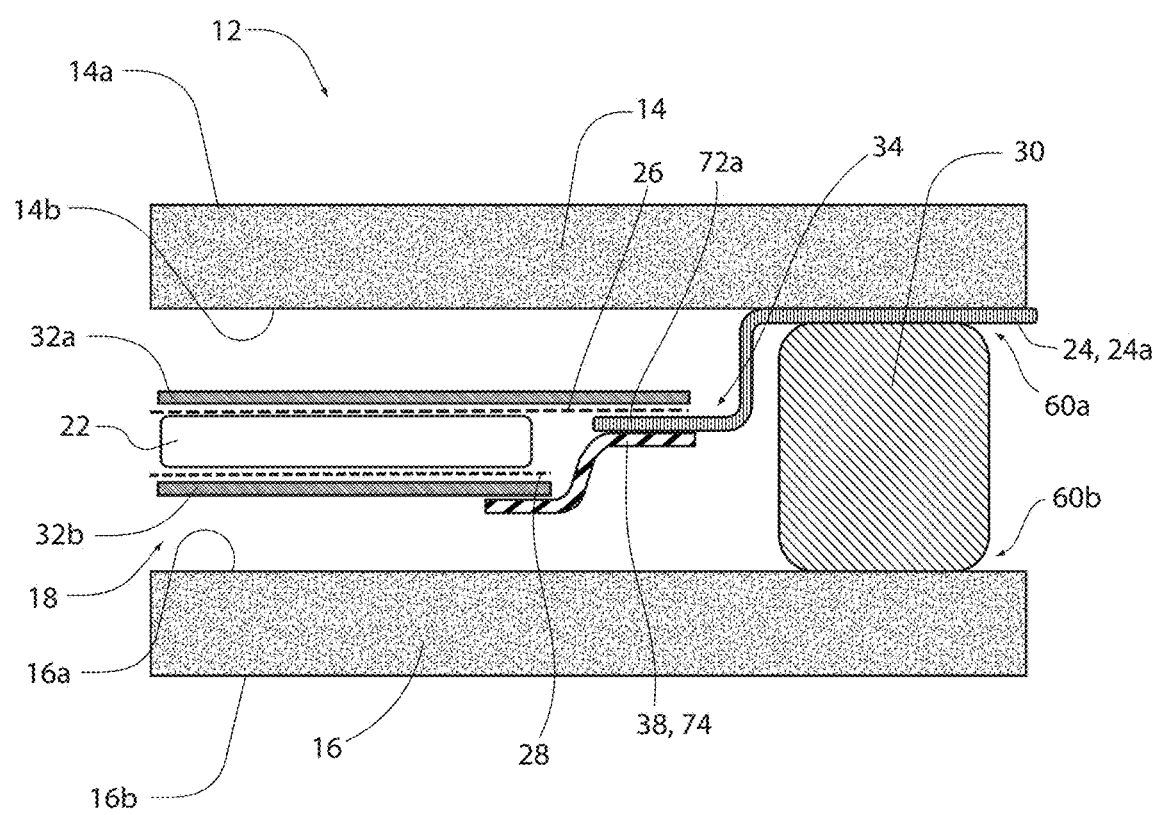
FIG. 8B is a cross-sectional view of an electro-optic element.

Referring now to FIGS. 8A and 8B, the first electrode 26 may be disposed on the interior surface of the first web substrate 32*a*, and the second electrode 28 may be disposed on the interior surface of the second web substrate 32*b*. The electrodes 26, 28 may conductively connect to the first bus bar 72*a* and the second bus bar 72*b* on the first side 70*a* and the second side 70*b*, respectively. The first electrical connection 24*a* may extend along a first side 60*a* of the primary seal 30 and the second electrical connection 24*b* may extend along a second side 60*b* of the primary seal 30. In this way, the primary seal 30 may seal the cavity 18 and separate the first electrical connection 24*a* from the second electrical connection 24*b*. Additionally, the secondary seal 38 may correspond to a flexible perimeter seal 74 configured to seal the perimeter edge 34 of the web substrates 32.

Figure 9A:
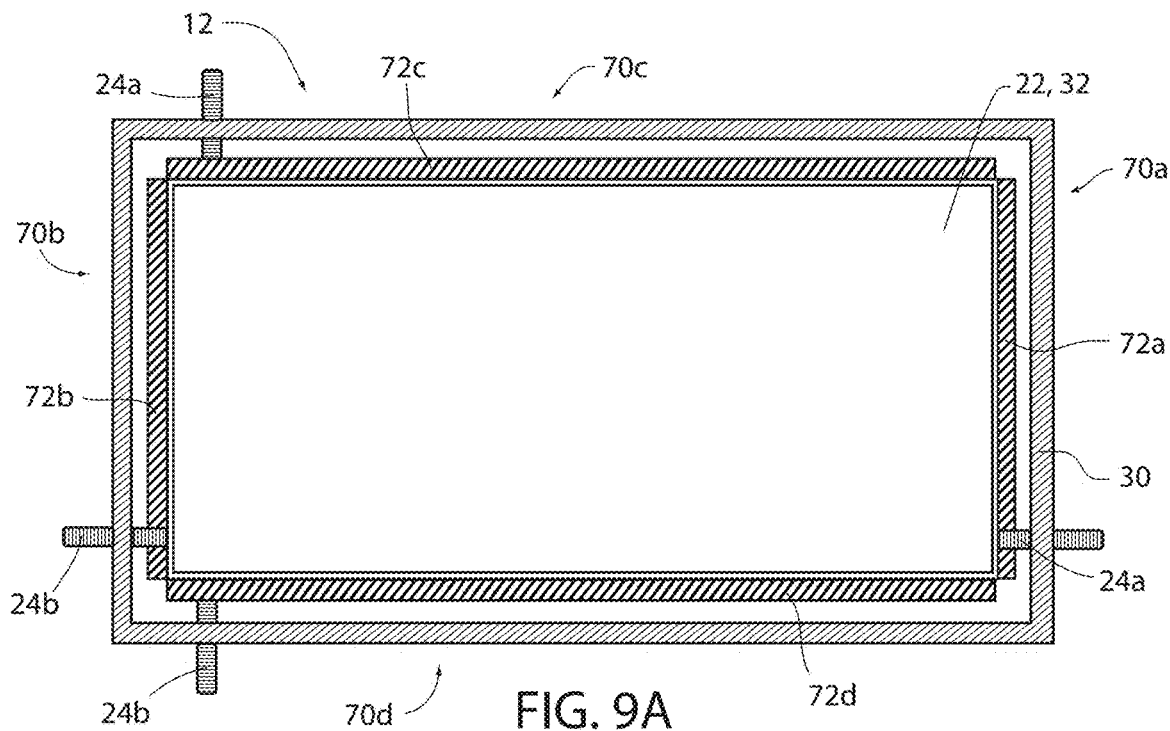
FIG. 9A is a top profile view of an electro-optic element.
Figure 9B:
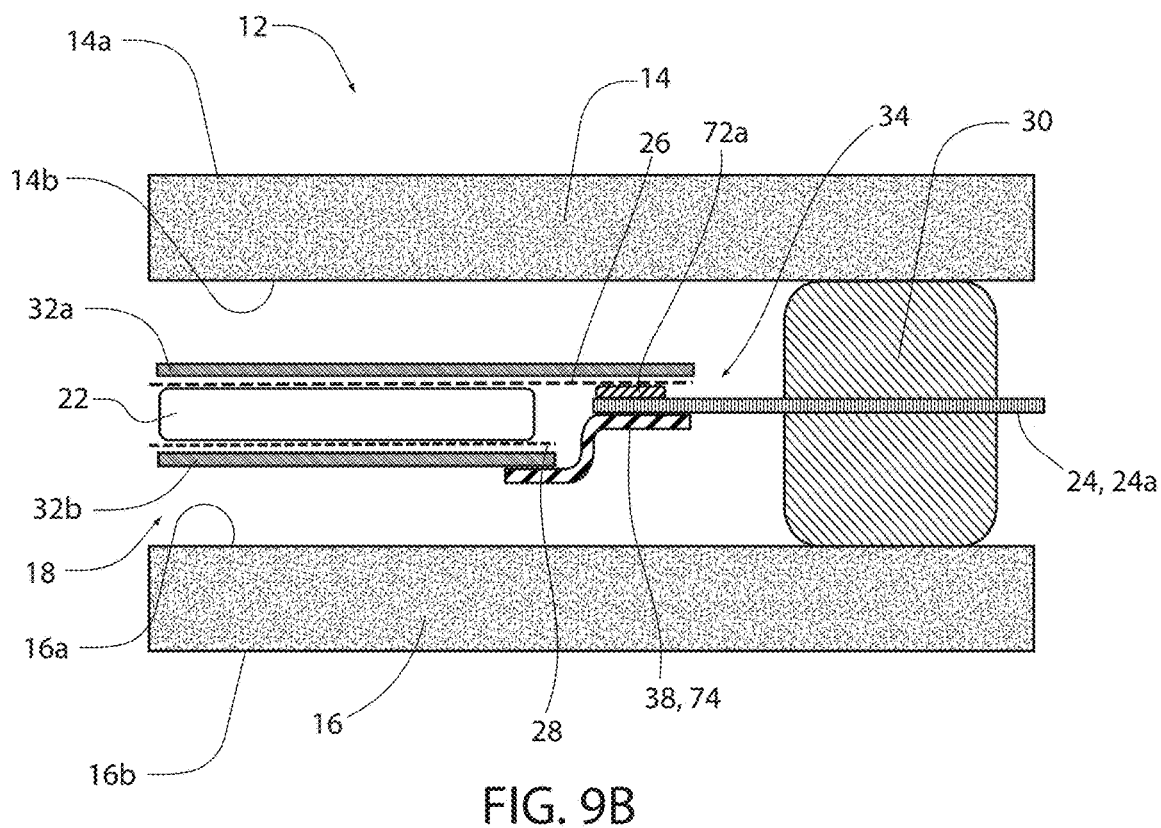
FIG. 9B is a cross-sectional view of an electro-optic element.

Referring now to FIGS. 9A and 9B, in some embodiments, the electro-optic element 12 may comprise a third bus bar 72*c* and a fourth bus bar 72*d*. The third bus bar 72*c* may extend along a third side, which may be opposite a fourth side 70*d* along which the fourth bus bar 72*d* may extend. In this configuration, each of the opposing sides (e.g. 70*a*-70*b* and 70*c*-70*d*) may be in connection with across opposing terminals of the electrical connections 24 such that the voltage potential may be controlled along each of the bus bars 72 extending along the perimeter 34 of the electro-optic element 12.

Additionally, the first electrode 26 may be disposed on the interior surface of the first web substrate 32*a* and the second electrode 28 may be disposed on the interior surface of the second web substrate 32*b*. The first electrical connection 24*a* may extend through the primary seal 30 on the first side 70*a* and the third side 70*c* to connection with the first bus bar 72*a* and the third bus bar 72*c*, respectively. The second electrical connection 24*b* may extend through the primary seal 30 on the second side 70*b* and the fourth side 70*d* to connection with the second bus bar 72*b* and the fourth bus bar 72*d*, respectively. The secondary seal 38 or interior barrier seal may correspond to a flexible perimeter seal 74 configured to seal the perimeter edge 34 of the web substrates 32.

Figure 10A:
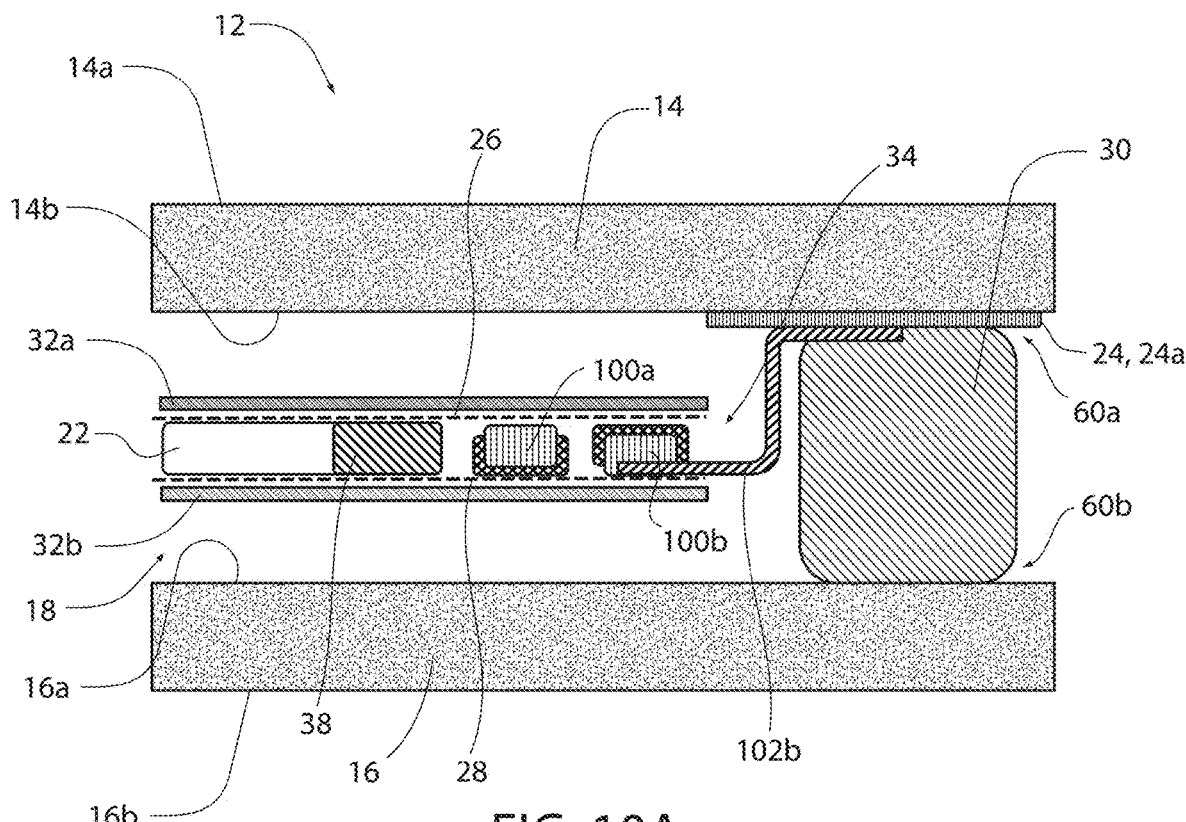
FIG. 10A is a cross-sectional view of an electro-optic element.
Figure 10B:
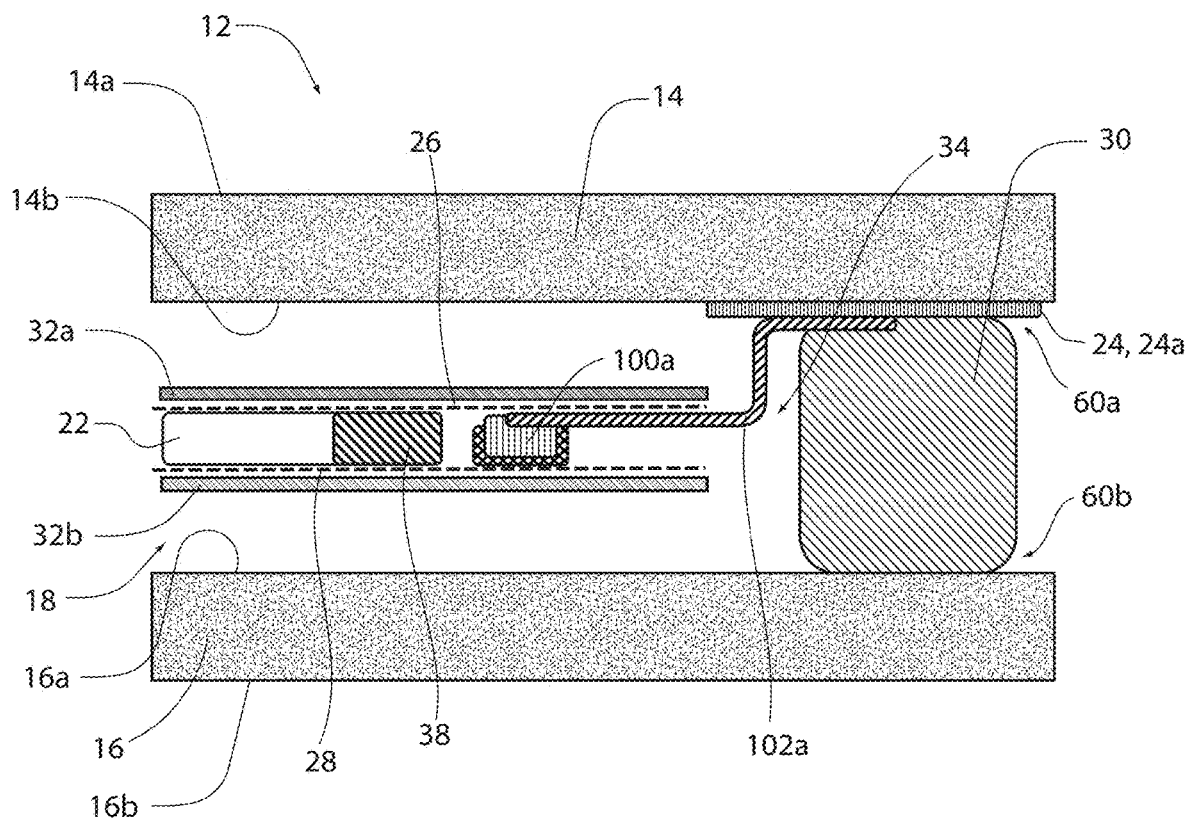
FIG. 10B is a cross-sectional view of an electro-optic element.

Referring now to FIGS. 10A and 10B, the electro-optic element 12 may comprise the first web substrate 32*a* and the second web substrate 32*b*. The first electrode 26 may be disposed on an interior surface of the first web substrate 32*a*, and the second electrode 28 may be disposed on an interior surface of the second web substrate 32*b*. The web substrates 32 may extend substantially parallel to the first substrate 14 and the second substrate terminating proximate to the perimeter edge 34 of the electro-optic element 12. In this configuration, the electrodes 26, 28 may conductively connect to the first electrical connection 24*a* and the second electrical connection 24*b*. In some embodiments as previously discussed, the first electrical connection 24*a* may extend along a first side 60*a* of the secondary seal 38 and the second electrical connection 24*b* may extend along a second side 60*b* of the primary seal 30. In this way, the secondary seal 38 may seal the cavity 18 and separate the first electrical connection 24*a* from the second electrical connection 24*b*.

Each of the electrical connections 24 may be conductively connected to the first electrode 26 and the second electrode 28 via a first insulating connector 100*a* and a second insulating connector 100*b*. The insulating connectors 100 may be connected to each of the web substrates 32 near the perimeter 34 and outside the primary seal 30 relative to the electro-optic medium 22. For example, the first insulating connector 100a may be configured to conductively connect a first conductive lead 102a from the first electrical connection 24a to the first electrode 26 while insulating the first conductive lead 102a from the second conductive electrode 28. The first insulating connector 100b may be configured to conductively connect a second conductive lead 102b from the second electrical connection 24b to the second electrode 28 while insulating the second conductive lead 100b from the first conductive electrode 26. To provide this utility, each of the insulating connectors 100 may comprise a conductive portion on a first side and may comprise an insulated coating disposed on a second side.

Figure 11A:
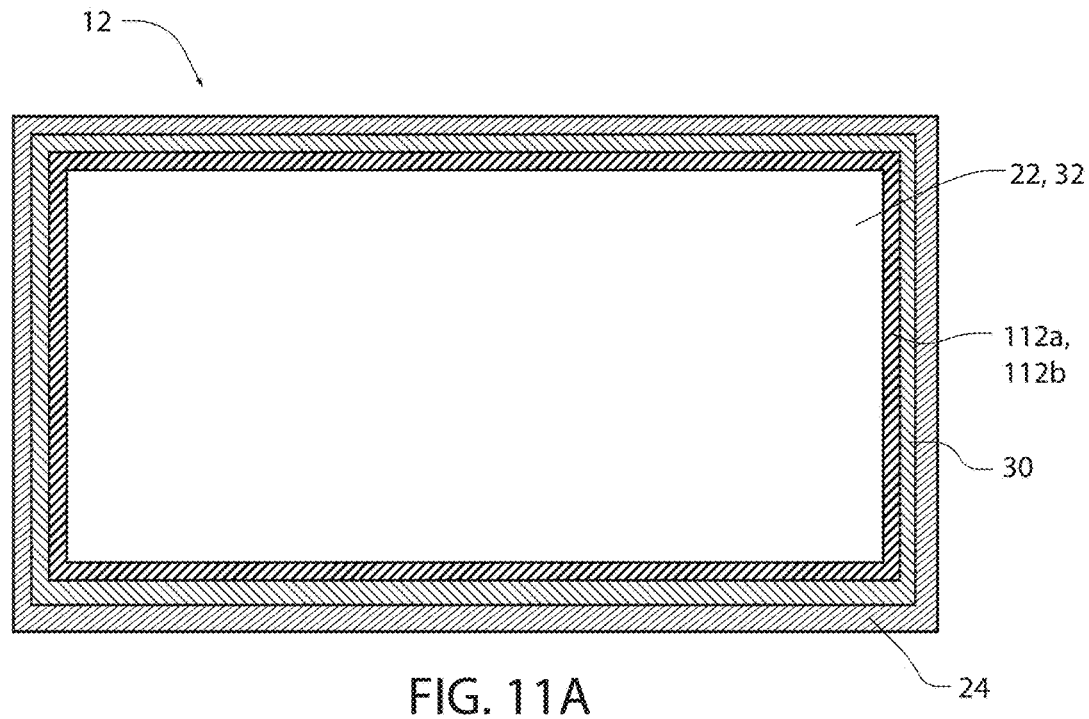
FIG. 11A is a top profile view of an electro-optic element.
Figure 11B:
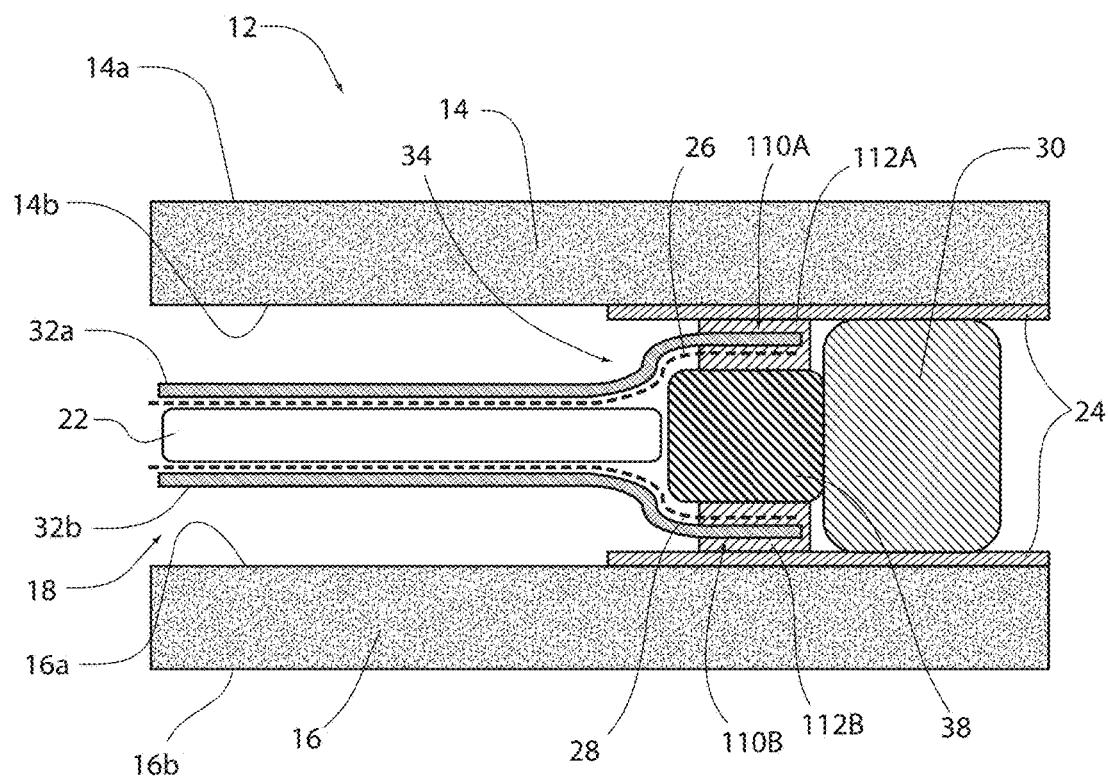
FIG. 11B is a cross-sectional view of an electro-optic element.

Referring now to FIGS. 11A and 11B, the electro-optic element 12 is shown comprising the first web substrate 32a and the second web substrate 32b extending outward from each other on the first side and the second side of the secondary seal 38. That is, a first perimeter portion 110a of the first web substrate 32a may extend outward to the second surface 14b of the first substrate 14. Additionally, a first conductive connector 112a may enclose the first perimeter portion 110a and conductively connect the first electrode 26 to the first electrical connection 24a, which may be formed as a coating on the second surface 14b. Further, a second perimeter portion 110b of the second web substrate 32b may extend outward to the third surface 16a of the second substrate 14. A second conductive connector 112b may enclose the second perimeter portion 110b and conductively connect the second electrode 28 to the second electrical connection 24b, which may be formed as a coating on the third surface 16a. In this configuration, the secondary seal 38 may seal the electro-optic medium 22 between the first web substrate 32a and the second web substrate 32b while insulating the conductive connectors 112a, 112b from each other.

Figure 12:
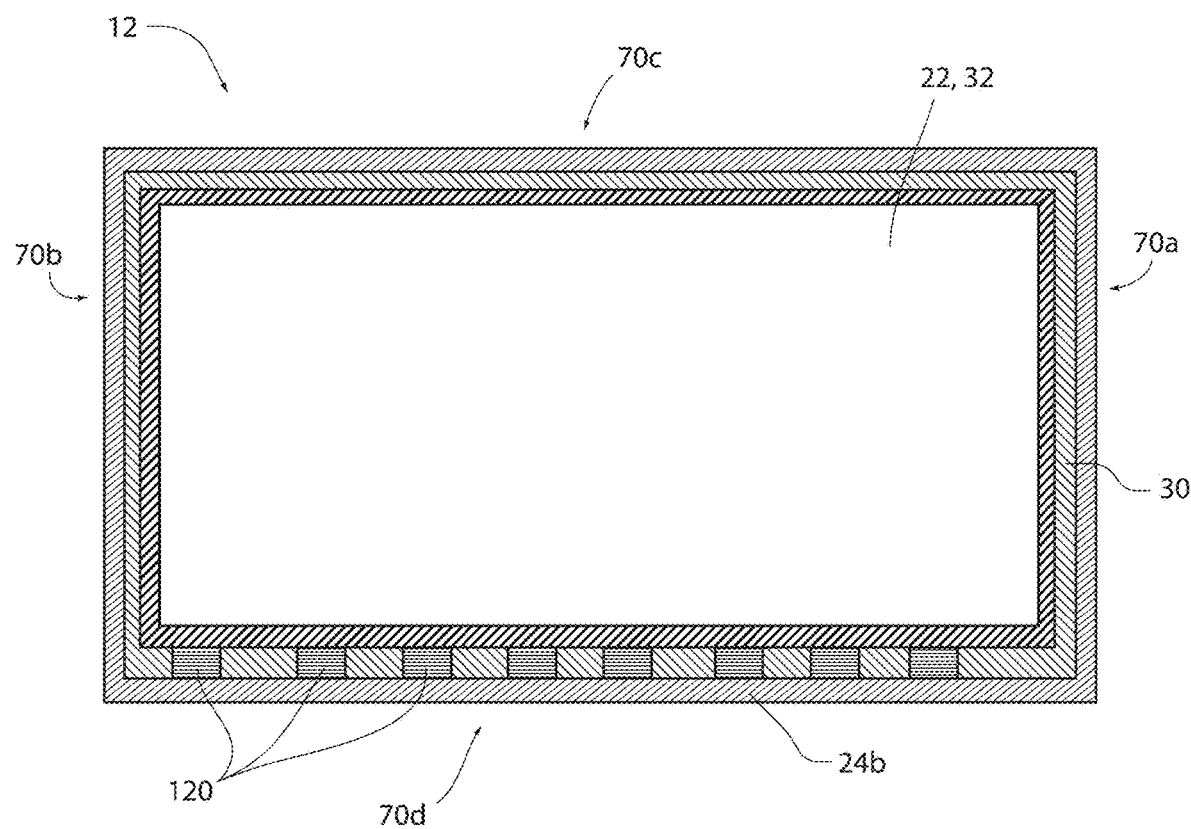
FIG. 12 is a top profile view of an electro-optic element.

Referring now to FIG. 12, in some embodiments, the first electrical connection 24a and the second electrical connection 24b may be implemented as a plurality of conductive contacts 120 distributed along the perimeter 34 of the electro-optic device 12. In an exemplary embodiment, the conductive contacts 120 may be formed of an electrically conductive adhesive (e.g. conductive epoxy containing silver flakes). In various embodiments, the conductive contacts 120 may be disposed on the second surface 14b and/or the third surface 16a from the electrical connections 24a, 24b to the first electrode 26 and the second electrode 28, respectively. As shown, the conductive contacts 120 may conductively connect the second electrical connection 24b extending along the fourth side 70d with the second electrode 28. In this configuration, the conductive connection from the second electrical connection 24b may be distributed along the fourth side 70d via the conductive contacts 120. Similarly, though not illustrated, the conductive connection from the first electrical connection 24a may be distributed along the third side 70c via the conductive contacts 120.

Figure 13A:
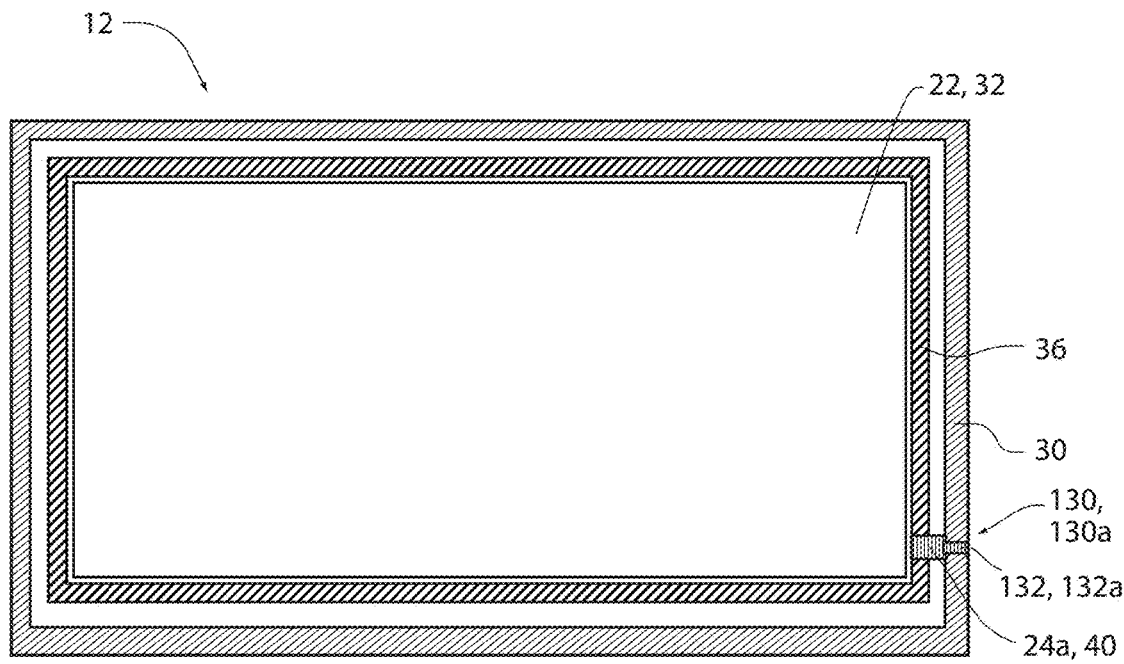
FIG. 13A is a top profile view of an electro-optic element.
Figure 13B:
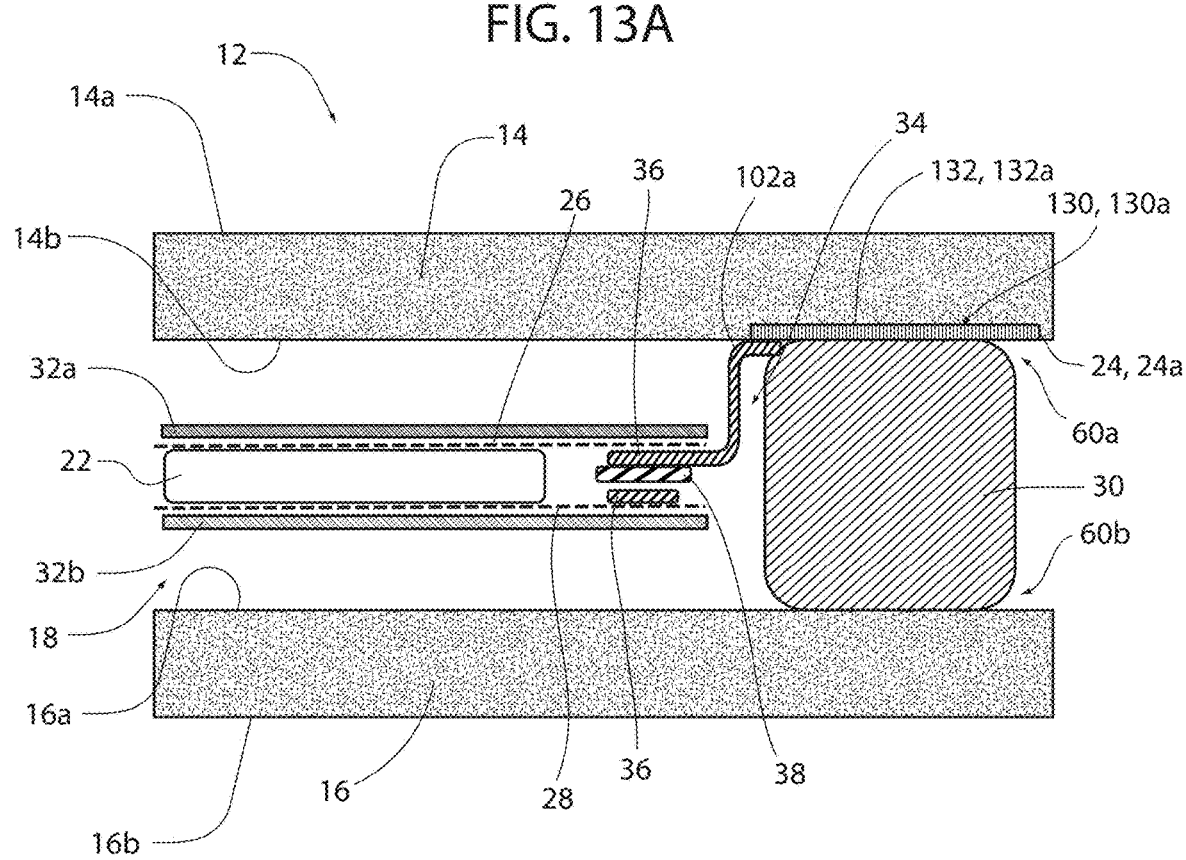
FIG. 13B is a cross-sectional view of an electro-optic element.

Referring now to FIGS. 13A and 13B, the electro-optic element 12 may comprise the first web substrate 32a and the second web substrate 32b. The first electrode 26 may be disposed on an interior surface of the first web substrate 32a and the second electrode 28 may be disposed on an interior surface of the second web substrate 32b. As shown in FIG. 13B, a first channel 130a may be formed in the second surface 14b and extend across the width of the primary seal 30. Within the channel 130, a first conductive layer 132a (e.g. conductive epoxy) may be disposed and be configured to conduct electrical signals from the first electrical connection 24a to the first electrode 26 via the first conductive lead 102a. Additionally, though not shown, a second channel 130b may be formed in the third surface 16a and extend across the width of the primary seal 30. The second channel 130b may comprise a second conductive layer 132b (e.g. conductive epoxy) configured to conduct electrical signals from the second electrical connection 24b to the second electrode 28 via a second conductive lead 102b.

In this configuration, the first electrical connection 24a may be conductively connected extending along the first side 60a of the primary seal 30 and the second electrical connection 24b may extend along the second side 60b of the primary seal 30. The primary seal 30 may seal the cavity 18 and separate the first electrical connection 24a from the second electrical connection 24b. Each of the electrical connections 24 may be conductively connected to the first electrode 26 and the second electrode 28 via the electrical terminals 36, which may be disposed between the first electrode 26 and the second electrode 28. Additionally, the secondary seal 38 may conductively separate the first electrode 26 and the second electrode 28 while additionally sealing the first web substrate 32a and a second web substrate 32b in a separated or spaced configuration thereby enclosing the electro-optic medium 22.

Figure 14A:
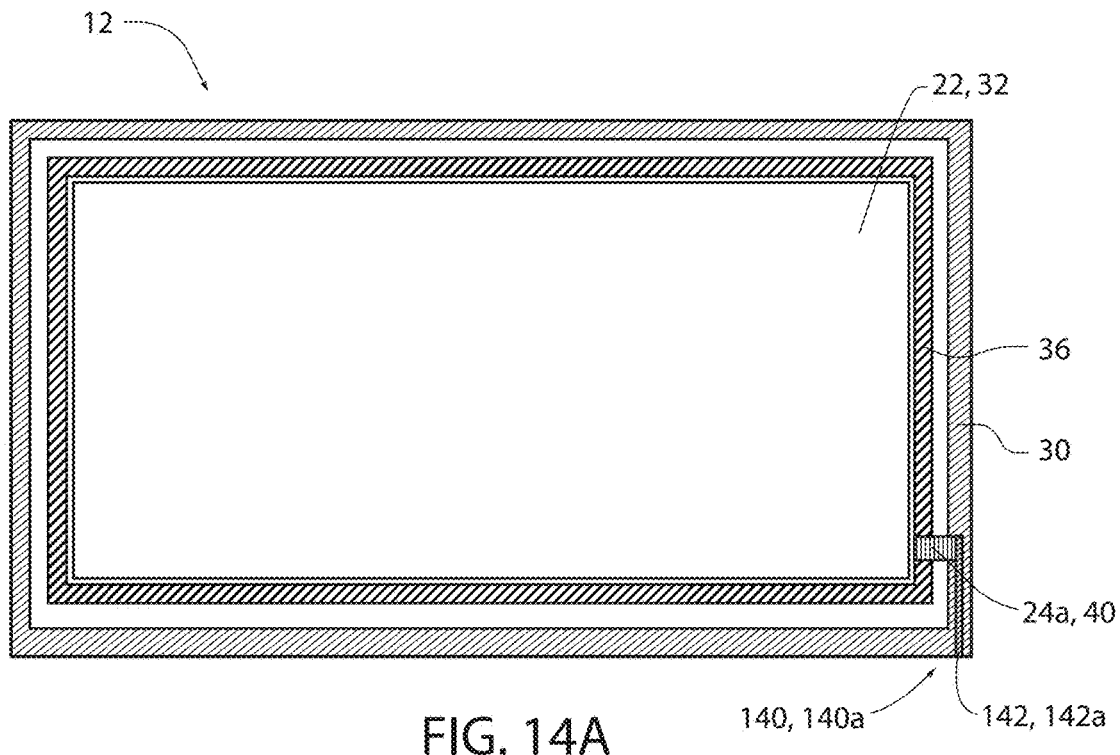
FIG. 14A is a top profile view of an electro-optic element.
Figure 14B:
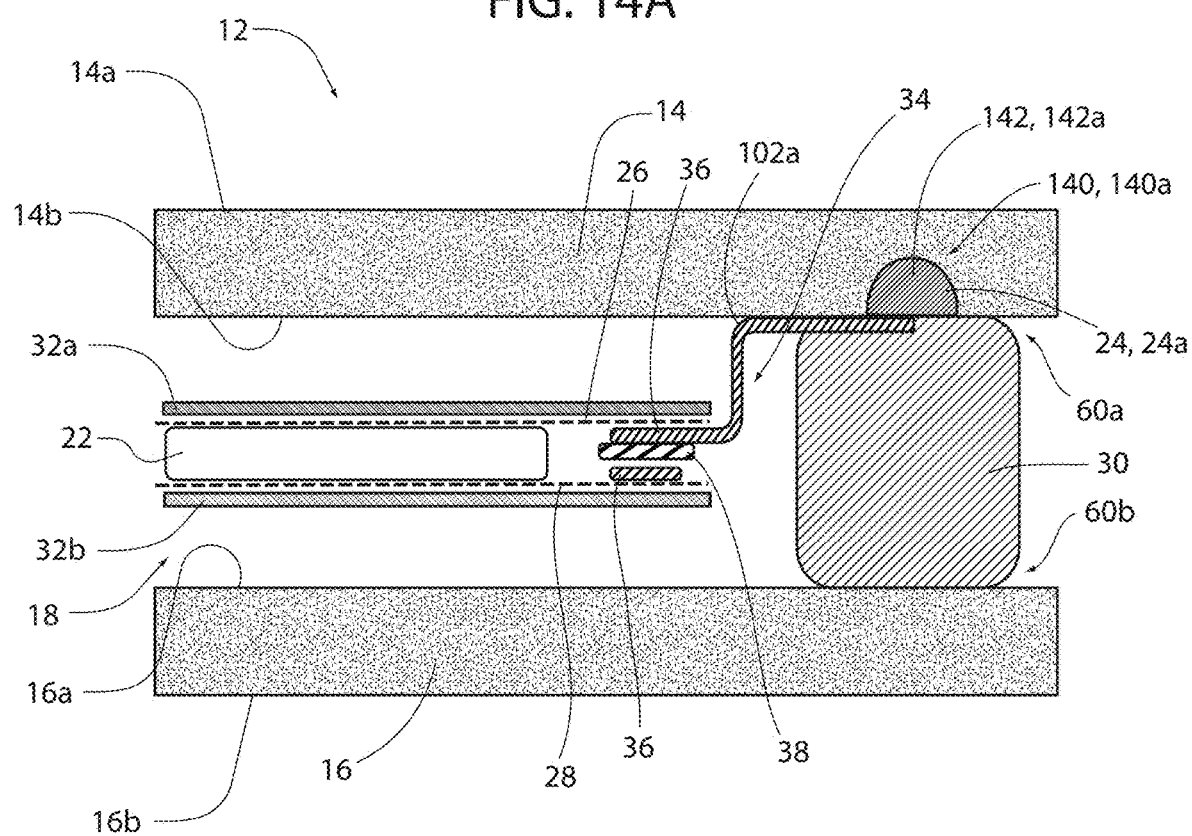
FIG. 14B is a cross-sectional view of an electro-optic element.

Referring now to FIGS. 14A and 14B, the electro-optic element 12 may comprise the first web substrate 32a and the second web substrate 32b. The first electrode 26 may be disposed on an interior surface of the first web substrate 32a and the second electrode 28 may be disposed on an interior surface of the second web substrate 32b. As shown in FIG. 14B, a first elongated channel 140a may be formed in the second surface 14b and extend parallel to and along a width of the primary seal 30 or exterior seal until the first elongated channel 140a terminates at an edge perpendicular to the side along which the primary seal 30 extends (e.g. the first side 70a as shown). In this way, the first elongated channel 140a may extend along the primary seal 30 such that the first conductive layer 142a (e.g. conductive epoxy) disposed therein may conduct electrical signals from first electrical connection 24a to the first electrode 26 via the first conductive lead 102a. Additionally, though not shown, a second elongated channel 140b may be formed in the third surface 16a and extend along the primary seal 30. The second elongated channel 140b may also comprise the second conductive layer 142b (e.g. conductive epoxy) configured to conduct electrical signals from the second electrical connection 24b to the second electrode 28 via a second conductive lead 102b.

In this configuration, the first electrical connection 24a may be conductively connected extending along the first side 60a of the primary seal 30 and the second electrical connection 24b may extend along the second side 60b of the primary seal 30. The primary seal 30 may seal the cavity 18 and separate the first electrical connection 24a from the second electrical connection 24b. Each of the electrical connections 24 may be conductively connected to the first electrode 26 and the second electrode 28 via the electrical terminals 36, which may be disposed between the first electrode 26 and the second electrode 28. Additionally, the secondary seal 38 may conductively separate the first electrode 26 and the second electrode 28 while additionally sealing the first web substrate 32a and a second web substrate 32b in a separated or spaced configuration thereby enclosing the electro-optic medium 22.

Figure 15A:
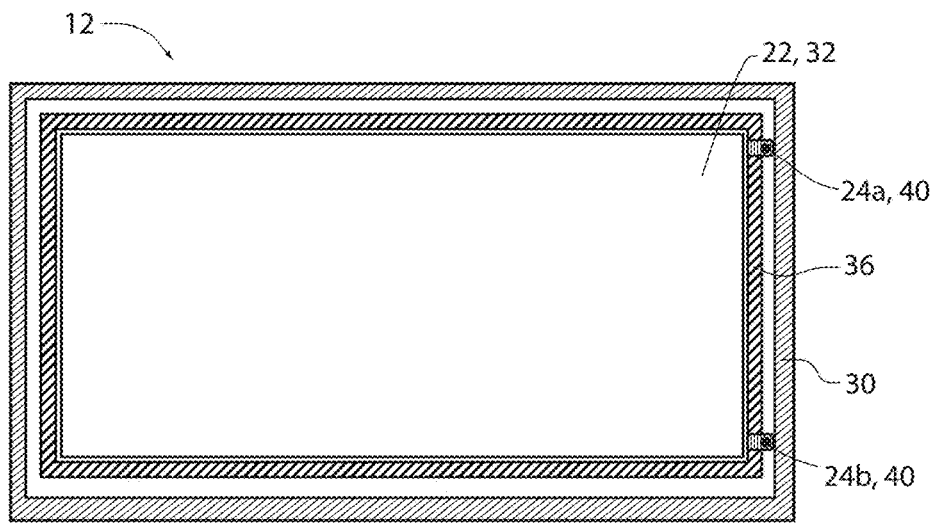
FIG. 15A is a top profile view of an electro-optic element.
Figure 15B:
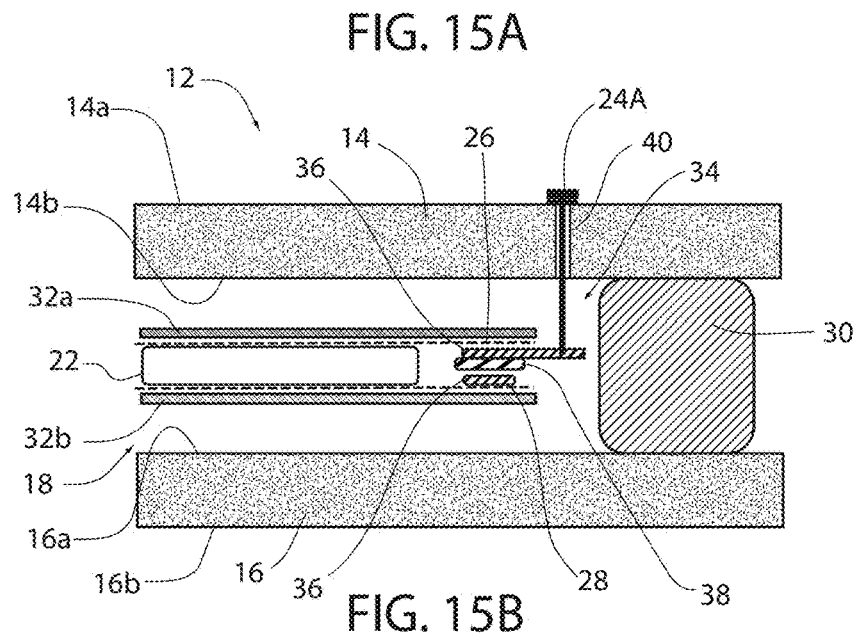
FIG. 15B is a cross-sectional view of an electro-optic element.
Figure 15C:
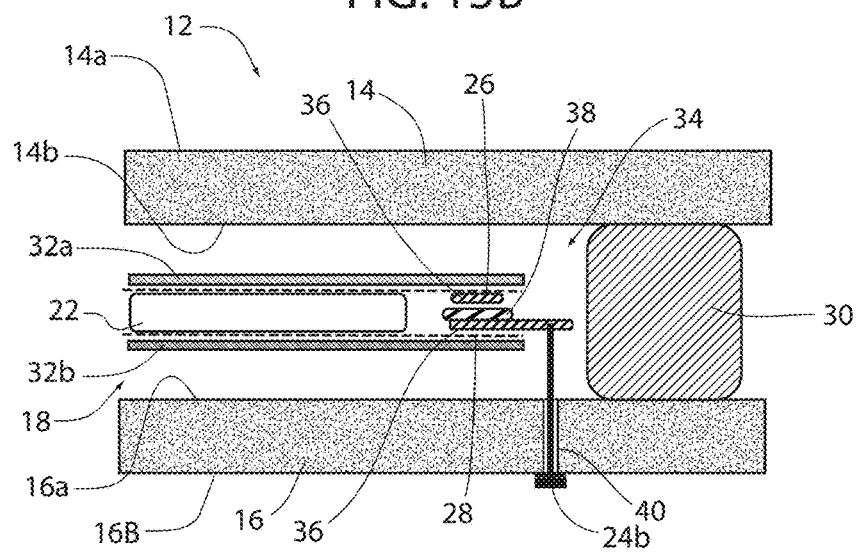
FIG. 15C is a cross-sectional view of an electro-optic element.

Referring now to FIGS. 15A, 15B, and 15C, the electro-optic element 12 may comprise the first web substrate 32a and the second web substrate 32b. The first electrode 26 may be disposed on an interior surface of the first web substrate 32a, and the second electrode 28 may be disposed on an interior surface of the second web substrate 32b. As shown in FIGS. 15B and 15C, the web substrates 32 may extend substantially parallel to the first substrate 14 and the second substrate terminating proximate to the perimeter edge 34 of the electro-optic element 12. In this configuration, the electrodes 26, 28 may conductively connect to the electrical connections 24 via electrical terminals 36. As shown, the electrical connections 24 may be formed through port holes 40 through the first substrate 14 and the second substrate 16. In this configuration, the electrical connections 24 may pass through the port holes 40 in the substrates 14 and 16 such that the electrical connections are exposed on the first surface 14a and the fourth surface 16b for connection to a control circuit. Additionally, the first web substrate 32a and the second web substrate 32b may be sealed together by a secondary seal 38 in a separated or spaced configuration thereby enclosing the electro-optic medium 22 and separating the first electrode from the second electrode 28.

Figure 16A:
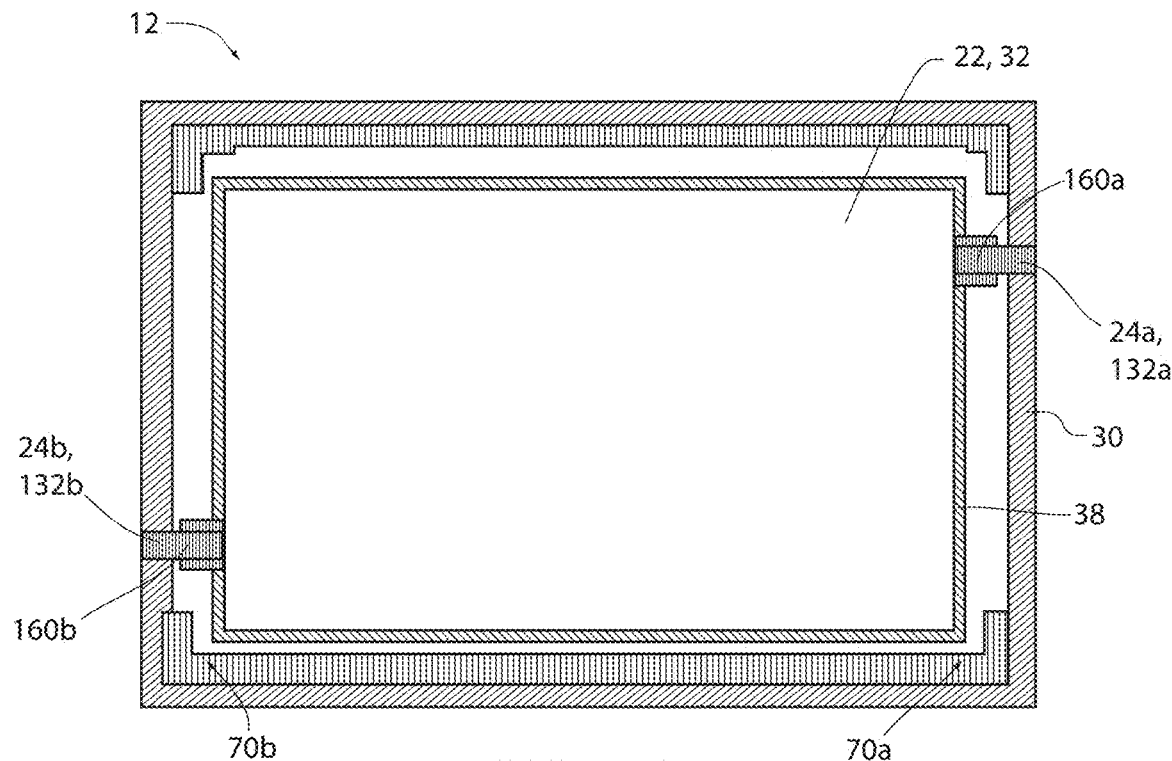
FIG. 16A is a top profile view of an electro-optic element.
Figure 16B:
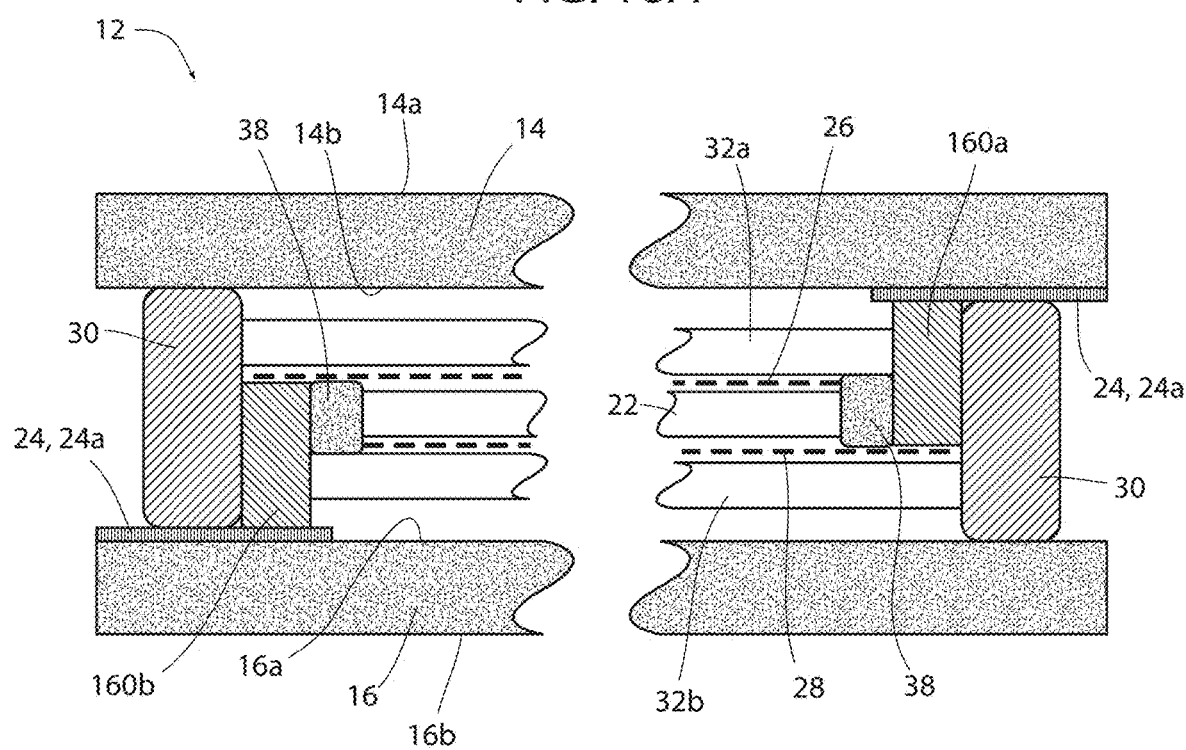
FIG. 16B is a cross-sectional view of an electro-optic element.

Referring now to FIGS. 16A and 16B, the first electrode 26 may be disposed on the interior surface of the first web substrate 32a and the second electrode 28 may be disposed on the interior surface of the second web substrate 32b. The first electrical connection 24a may conductively connect to the first electrode 26 disposed on the second surface 14b. The second electrical connection 24b may conductively connect to the second electrode 28 disposed on the third surface 16a. The first electrical connection 24a may extend along a first side 60a of the primary seal 30 and the second electrical connection 24b may extend along a second side 60b of the primary seal 30. In this way, the primary seal 30 or exterior seal may seal the cavity 18 and separate the first electrical connection 24a from the second electrical connection 24b. Additionally, the secondary seal 38 may correspond to a flexible perimeter seal 74 configured to seal the perimeter edge 34 of the web substrates 32.

Between the primary seal 30 or exterior seal and the secondary seal 38 or interior barrier seal on the first side 72a, the electro-optic element 12 may comprise a first conductive terminal 160a configured to conductively connect the first conductive layer 132a to the second electrode 28. In this configuration, the first conductive terminal 160a may extend past the first web substrate 32a between the primary seal 30 and the secondary seal 38 to the second electrode 28 on the second web substrate 32b. Between the primary seal 30 and the secondary seal 38 on the second side 72b, the electro-optic element 12 may comprise a second conductive terminal 160b configured to conductively connect the second conductive layer 132b to the first electrode 26. In this configuration, the second conductive terminal 160b may extend past the second web substrate 32b between the primary seal 30 and the secondary seal 38 to the first electrode 26 on the first web substrate 32b.

Figure 17:
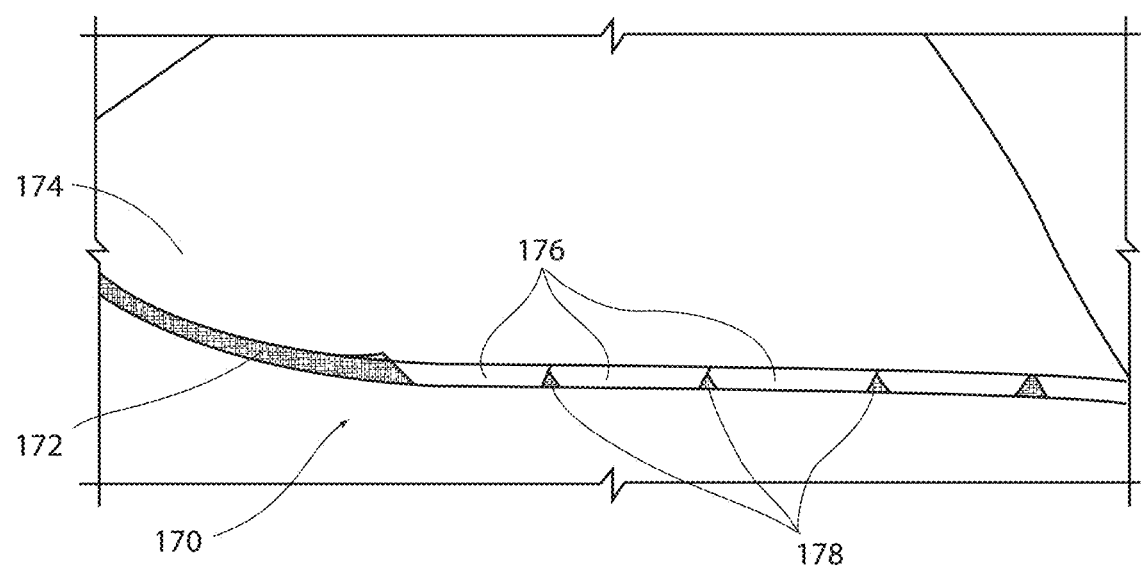
FIG. 17 is a projected pictorial view of a rigid substrate comprising a web substrate formed to a surface.

Referring now to FIG. 17, in some embodiments, the electro-optic element 12 may comprise a curved profile edge 170. The profile edge 170 may correspond to a cylindrical or otherwise bent shape formed about the perimeter of a rigid substrate as discussed herein. As demonstrated in FIG. 17, the curved profile edge 170 may be formed in the rigid substrate 172 that may correspond to the first substrate 14 and/or the second substrate 16. A web substrate 174 is shown in connection with the rigid substrate 172. In such embodiments, the web substrate 174 may comprise a plurality of tabs 176, which may be wrapped from a second side 172b of the rigid substrate 172 to a first side 172a. One or more of the tabs 176 may be separated by stress relief cuts 178, which may provide for the material of the web substrate 174 to conform to the profile edge 170.

Figure 18:
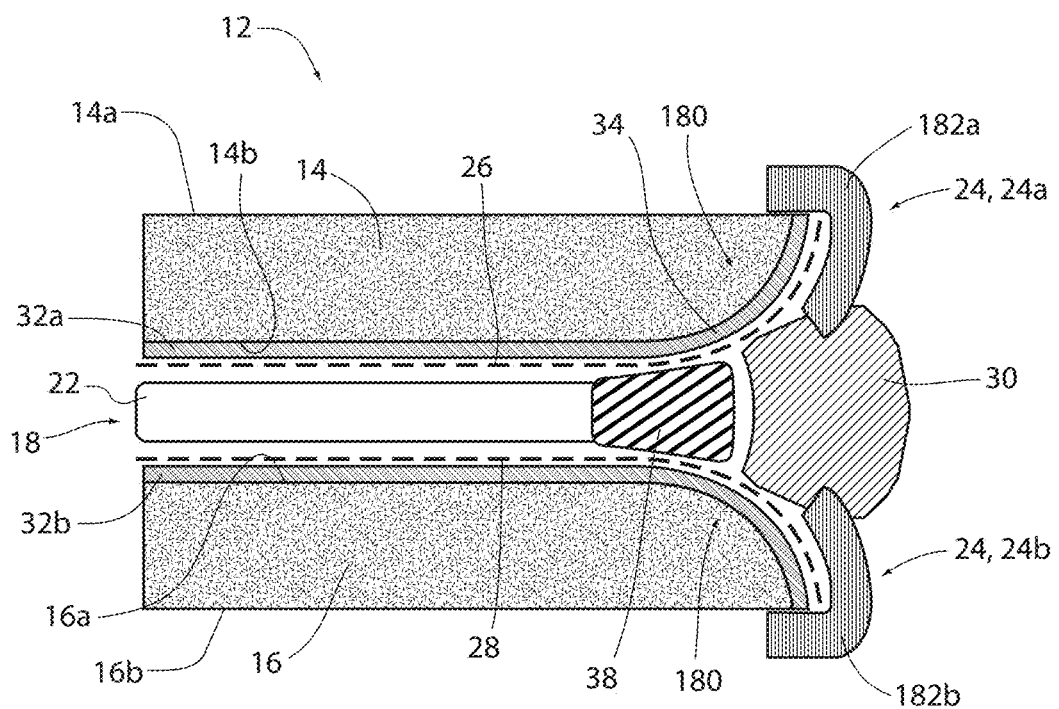
FIG. 18 is a cross-sectional view of an electro-optic element.

Referring now to FIG. 18, in some embodiments, the electro-optic element 12 may comprise one or more ground or rounded edges 180. In such embodiments, the electro-optic element 12 may comprise the first web substrate 32a and the second web substrate 32b extending outward proximate to the perimeter edge 34. The secondary seal 38 may seal the electro-optic medium 22 between the first web substrate 32a and the second web substrate 32b while insulating and spacing the first electrode 26 form the second electrode 28. Each of electrodes 26, 28 may extend outward along the rounded edges 180 passed the primary seal 30 or exterior seal from the second surface 14b and the third surface 16a, respectively. The first electrode 26 may be in connection with the first electrical connection 24a via a first conductive terminal 182a and the second electrode 28 may be in connection with the second electrical connection 24b via a second conductive terminal 182b. In this configuration, the electro-optic element 12 may be effectively connected to a control circuit to control the transmittance through the substrates 14 and 16.

Figure 19:
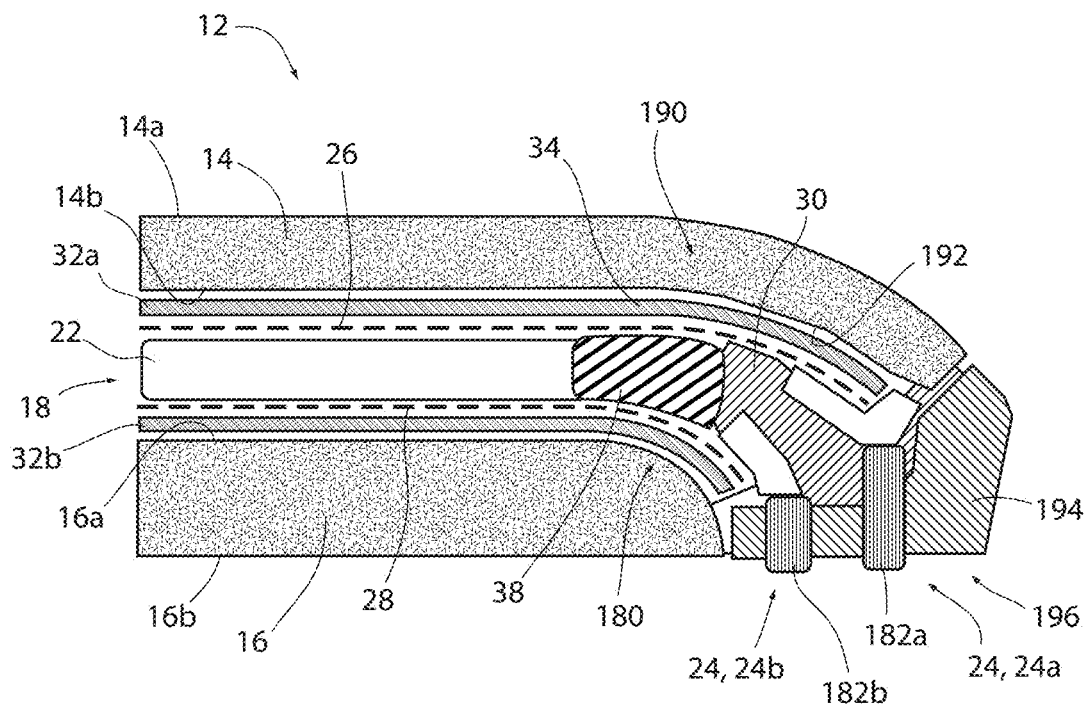
FIG. 19 is a cross-sectional view of an electro-optic element.

Referring now to FIG. 19, the electro-optic element 12 may comprise the round edge 180 on the second substrate 16 in combination with the first substrate 14 comprising a contoured surface profile 190, which may be complementary to the rounded edge 180. In such embodiments, the electro-optic element 12 may comprise the first web substrate 32a and the second web substrate 32b extending outward proximate to the perimeter edge 34. The secondary seal 38 may seal the electro-optic medium 22 between the first web substrate 32a and the second web substrate 32b while insulating and spacing the first electrode 26 form the second electrode 28. The first electrode 26 and the first web substrate 32a may extend outward along the second surface 14b along an interior rounded profile 192 of the contoured surface profile 190. Additionally, the second electrode 28 and the second web substrate 32b may extend outward along the rounded edge 180 passed the primary seal 30 on the third surface 16a. Each of the first electrode 26 and the second electrode 28 may be in conductive connection with the first electrical connection 24a and the second electrical connection 24b via the first conductive terminal 182a and the second conductive terminal 182b, respectively. Each of the conductive terminals 182 may separately pass through a frame 194 forming an outside perimeter 196 of the electro-optic element 12 for connection with the first electrical connection 24a and the second electrical connection 24b.

Figure 20A:
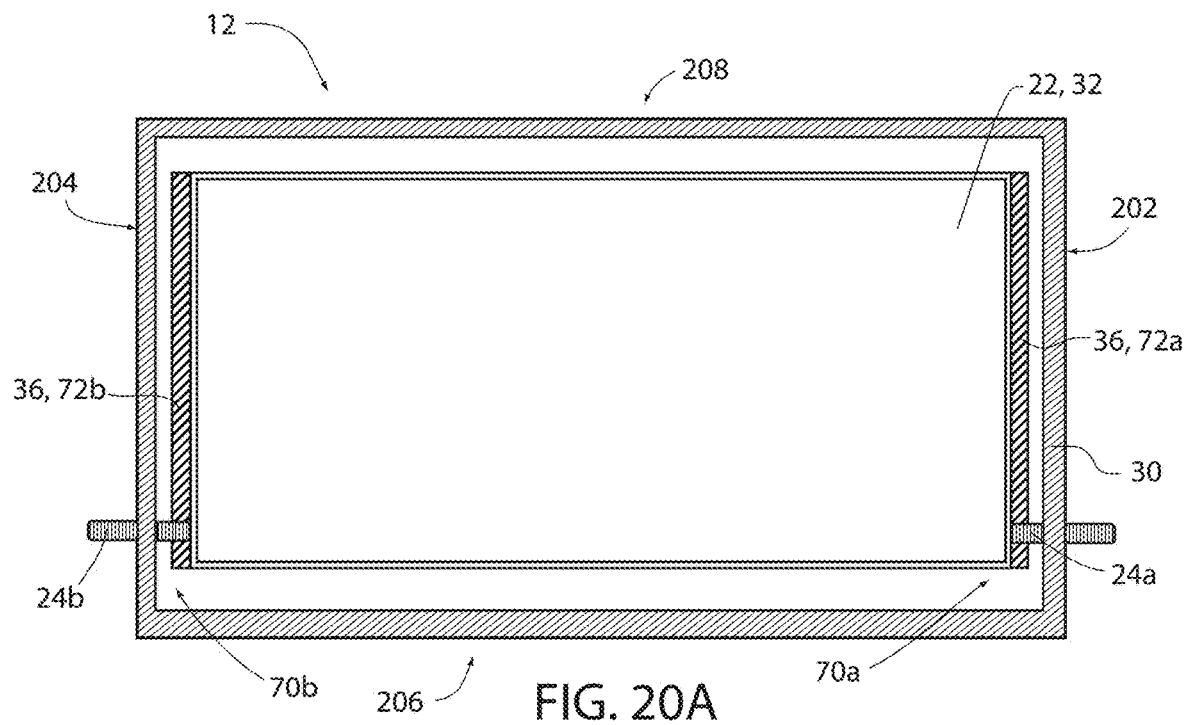
FIG. 20A is a top profile view of an electro-optic element.
Figure 20B:
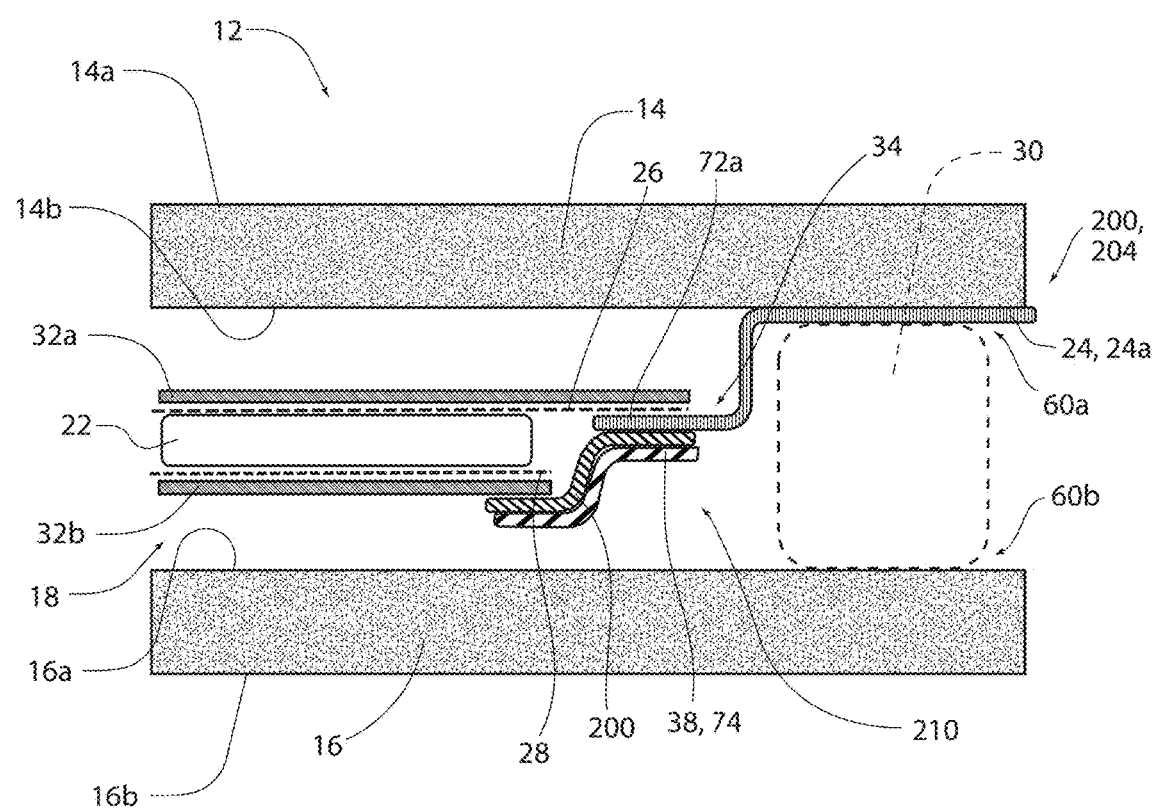
FIG. 20B is a cross-sectional view of a first side and second side of an electro-optic element comprising a sealant layer.
Figure 20C:
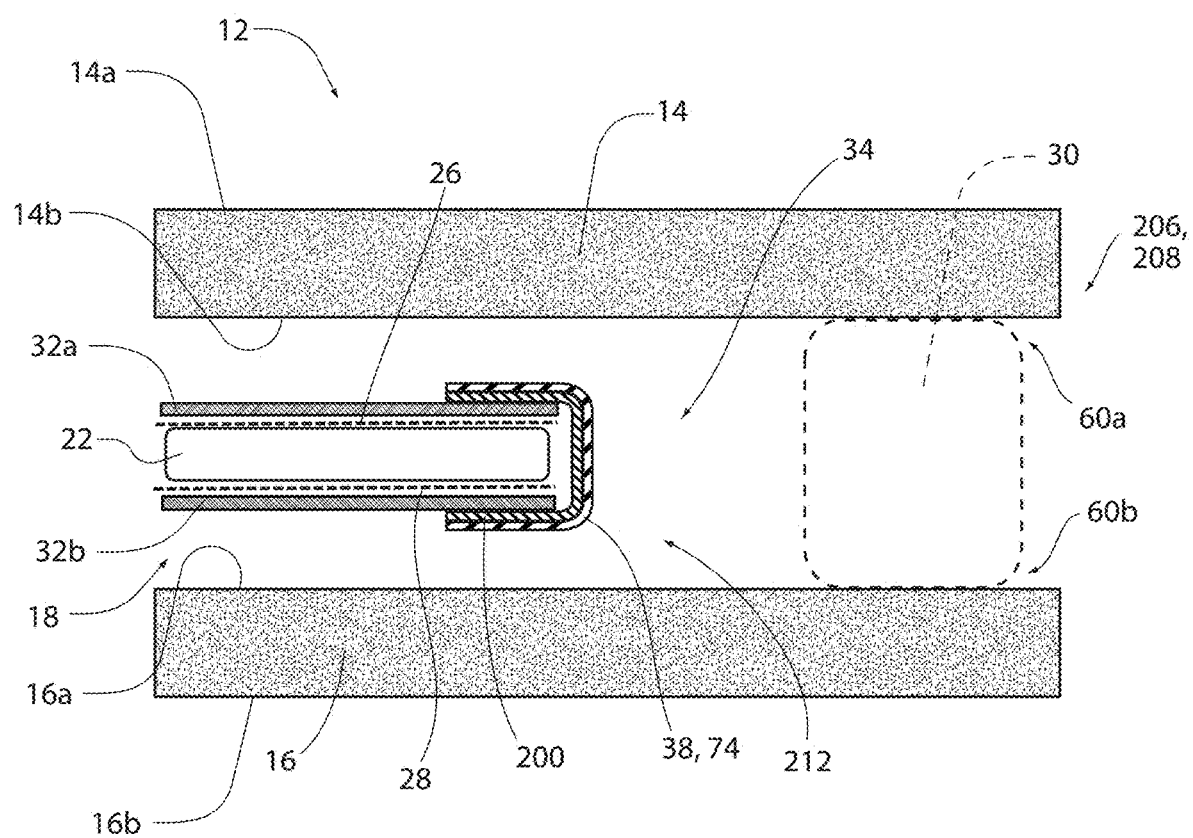
FIG. 20C is a cross-sectional view of a third side and fourth side of an of an electro-optic element comprising a sealant layer.

Referring now to FIGS. 20A, 20B, and 20C, in some implementations, the electro-optic element may comprise a barrier layer 200. The barrier layer 200 may correspond to a polymeric film device configured to encapsulate the electro-optic medium 22 between the first web substrate 32a and the second web substrate 32b. In various implementations, barrier layer 200 may comprise a barrier tape adhered to the perimeter edge 34 of the web substrates 32 via an adhesive (e.g. an epoxy thermoset, etc.). As discussed herein, the barrier layer 200 may be applied to the electro-optic element 12 in combination with the flexible perimeter seal 74. For clarity, the flexible perimeter seal 74 was previously discussed as the secondary seal. However, it may be understood that the flexible perimeter seal 74 may be implemented in various embodiments with or without the primary seal 30. In this configuration, the barrier layer 200 may be utilized in combination with the flexible perimeter seal 74 to create a barrier configured to prevent oxygen, moisture, and various contaminants from infiltrating the electro-optic medium 22.

As discussed in various implementations of the disclosure, the electro-optic element 12 may comprise the first web substrate 32a and the second web substrate 32b. The first electrode 26 may be disposed on an interior surface of the first web substrate 32a, and the second electrode 28 may be disposed on an interior surface of the second web substrate 32b. The web substrates 32 may extend substantially parallel to the first substrate 14 and the second substrate terminating proximate to the perimeter edge 34 of the electro-optic element 12. In this configuration, the electrodes 26, 28 may conductively connect to the first electrical connection 24a and the second electrical connection 24b. As shown in FIG. 20B, an outline of the primary seal 30 is shown demonstrating that the primary seal 30 may be omitted in some examples of the electro-optic element 12. This omission of the primary seal 30 may be possible as a result of the barrier layer 200 successfully replacing the utility or limiting a need for the primary seal 30. Though the omission of the primary seal 30 may be possible, in various implementations, the primary seal may be implemented in combination with the barrier layer 200 and the flexible perimeter seal 74.

Still referring to FIGS. 20A, 20B, and 20C, the first electrode 26 may be disposed on the interior surface of the first web substrate 32a, and the second electrode 28 may be disposed on the interior surface of the second web substrate 32b. The electrodes 26, 28 may conductively connect to the first bus bar 72a and the second bus bar 72b on the first side 70a and the second side 70b, respectively. In embodiments comprising the primary seal 30, the first electrical connection 24a may extend along a first side 60a of the primary seal 30 and the second electrical connection 24b may extend along a second side 60b of the primary seal 30. In such implementations, the primary seal 30 may seal the cavity 18 and separate the first electrical connection 24a from the second electrical connection 24b.

The electrical connections 24a, 24b may be in connection with a first side 202 and a second side 204 of the electro-optic element 12. The first side 202 and the second side 204 may correspond to opposing sides of the electro-optic element 12. Accordingly, a third side 206 and a fourth side 208 may connect the first side 202 and the second side 204. Similar to the first side 202 and the second side 204, the third side 206 and the fourth side 208 may extend along the perimeter edge 34 of the web substrates 32. However, the third side 206 and the fourth side 208 may not be in direct connection with the electrical connections 24 and may not comprise the bus bars 72. Accordingly, as shown in FIG. 20C, the third side 206 and the fourth side 208 may comprise a seal configuration that differs from the first side 202 and the second side 204.

Referring now to FIG. 20C, the third side 206 and/or the fourth side 208 may comprise the barrier layer 200 and the flexible perimeter seal 74 in connection with an exterior surface of each of the first web substrate 32a and the second web substrate 32b. Similar to the first side 202 and the second side 204, the barrier layer 200 may be applied to the electro-optic element 12 in combination with the flexible perimeter seal 74. On the third side 206 and/or the fourth side 208, the flexible perimeter seal 74 may be laminated or adhered to the exterior surfaces of the first web substrate 32a and the second web substrate 32b thereby encapsulating the electro-optic medium 22 between the first web substrate 32a and the second substrate 32b. Accordingly, as discussed herein, one or more of the sides 202, 204, 206, 208 of the electro-optic device 12 may comprise the perimeter seal in a first configuration 210 as shown in FIG. 20B or a second configuration 212 as shown in FIG. 20C.

As used herein, the term "substantially" refers to a condition of exhibiting total or near-total extent or degree of a characteristic or property of interest. One of ordinary skill will understand that a characteristic (e.g. dimensional, chemical, optical, etc.) may vary from a defining characteristic as a result of variations in manufacturing or based on similar functional benefits being provided by a similar configuration. For example, a structure defined a substantially parallel may not be perfectly parallel while still being reasonably understood to be parallel in nature. Similarly, an aspect described as being co-extensive or extending along an extent may not extend completely to an edge, while providing for an equivalent operational benefit. Accordingly, the term substantially is utilized herein to emphasize that such equivalents and variations may be encompassed by the disclosed implementations invention. In general, the term substantially may provide for a variation of 1-10% of the defined property. While the relationship associated with the term "substantially" may exceed the percent ranges discussed herein, it shall be understood to be limited to the extent that the person having skill in the art would still define the relationship to be recognizable in relation the field of technology described.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the claims as interpreted according to the principles of patent law, including the Doctrine of Equivalents.

What is claimed is:

1. An electro-optic assembly comprising a first substrate forming a first surface and a second surface and a second substrate forming a third surface and a fourth surface, wherein the electro-optic assembly comprises:
    a first web substrate adjacent to the second surface;
    a first electrode formed on a first interior surface of the first web substrate;
    a second web substrate adjacent to the third surface;
    a second electrode formed on a second interior surface of the second web substrate;
    an electro-optic medium disposed between the first electrode and the second electrode;
    wherein each of the web substrates form a plurality of edges forming a perimeter of the web substrates and each of the web substrates comprise:
        a first edge portion comprising a first electrical terminal conductively connected to the first electrode;
        a second edge portion opposing the first edge portion comprising a second electrical terminal conductively connected to the second electrode; and
        a third edge portion opposing a fourth edge portion; and
    an interior seal extending along each of the plurality of perimeter edges between the first web substrate and the second web substrate, wherein the interior seal comprises a flexible seal laminated in connection with each of the first web substrate and the second web substrate via a barrier tape comprising an epoxy thermoset.

2. The electro-optic assembly according to claim 1, wherein the electrical terminals are omitted from the third edge portion and the fourth edge portion, such that a voltage potential is applied across the electro-optic medium from the first edge portion and the second edge portion.

3. The electro-optic assembly according to claim 1, wherein the interior seal encapsulates the electro-optic medium between the first interior surface and the second interior surface of the first web substrate and the second web substrate.

4. The electro-optic assembly according to claim 3, further comprising an exterior seal extending along an outer perimeter of the first substrate and the second substrate.

5. The electro-optic assembly according to claim 4, wherein the exterior seal forms a sealed cavity enclosed around the first web substrate, the second web substrate, and the interior sea I.

6. The electro-optic assembly according to claim 4, wherein each of the first electrical terminal and the second electrical terminal extend substantially along an extent of the first edge portion and the second edge portion between the third edge portion and the fourth edge portion.

7. The electro-optic assembly according to claim 6, further comprising:
a first conductive connection extending through the exterior seal and at least a portion of the interior seal and conductively connected to the first electrical terminal such that the first electrode is conductively connected to a control circuit.

8. The electro-optic assembly according to claim 7, further comprising:
a second conductive connection extending through the exterior seal and at least a portion of the interior seal and conductively connected to the second electrical terminal such that the second electrode is conductively connected to the control circuit.

9. The electro-optic assembly according to claim 1, wherein each of the first conductive connection and the second conductive connection extend through the exterior seal along the third edge portion.

10. The electro-optic assembly according to claim 9, wherein the interior seal encloses over at least a portion each of the first conductive connection to the first electrical terminal and the second conductive connection to the second electrical terminal between the first web substrate and the second web substrate.

11. The electro-optic assembly according to claim 8, wherein the third edge portion extends adjacent to and between the first edge portion and the second edge portion of the plurality of perimeter edges.

12. The electro-optic assembly according to claim 1, wherein the first substrate and the second substrate are rigid substrates formed of a glass or polymeric material.

13. The electro-optic assembly according to claim 1, wherein the electro-optic medium comprises an electrochromic material and the interior seal is configured to encapsulate the electrochromic material between the first web substrate and the second web substrate preventing an infiltration of oxygen and moisture into the electrochromic material.

14. The electro-optic assembly according to claim 1, wherein the interior seal is configured to conductively isolate the first electrical terminal from the second electrode and the second electrical terminal from the first electrode.

15. A variable transmittance panel comprising:
a first substrate forming a first surface and a second surface;
a second substrate forming a third surface and a fourth surface;
an electro-optic assembly enclosed within a sealed cavity between the first substrate and the second substrate by a first perimeter seal, the electro-optic assembly comprising:
a first web substrate adjacent to the second surface;
a first electrode formed on a first interior surface of the first web substrate;
a second web substrate adjacent to the third surface;
a second electrode formed on a second interior surface of the second web substrate;
an electrochromic medium disposed between the first electrode and the second electrode;
wherein each of the web substrates form a plurality of edges forming a perimeter of the web substrates and the first perimeter seal comprises a flexible seal laminated in connection with each of the first web substrate and the second web substrate via a barrier tape adhered to the perimeter of the web substrates, and wherein the plurality of edges comprise:
a first edge portion in connection with a first electrical terminal in connection with the first electrode;
a second edge portion opposing the first edge portion in connection with a second electrical terminal in connection with the second electrode; and
a third edge portion opposing a fourth edge portion; and
a second perimeter seal extending along each of the plurality of perimeter edges between the first web substrate and the second web substrate, wherein the second perimeter seal encapsulates the electrochromic medium between the first interior surface and the second interior surface of the first web substrate and the second web substrate.

16. The electro-optic assembly according to claim 15, wherein the each of the first electrical terminal and the second electrical terminal extend substantially along an extent of the first edge portion and the second edge portion between the third edge portion and the fourth edge portion.

17. The electro-optic assembly according to claim 15, further comprising:
a first conductive connection extending through the first seal and at least a portion of the second seal, wherein the first conductive connection is connected to the first electrical terminal such that the first electrode is conductively connected to a control circuit.

18. The electro-optic assembly according to claim 17, further comprising:
a second conductive connection extending through the first seal and at least a portion of the second seal wherein the second conductive connection is connected to the second electrical terminal such that the second electrode is conductively connected to the control circuit.

19. A variable transmittance panel comprising:
an exterior assembly configured to encapsulate an electro-optic assembly, the exterior assembly comprising a first substrate, a second substrate, and a first perimeter seal forming a sealed cavity between the first substrate and the second substrate;
the electro-optic assembly comprising:
a first web substrate adjacent and a second web substrate disposed in the sealed cavity;
a first electrode formed on a first interior surface of the first web substrate;
a second electrode formed on a second interior surface of the second web substrate;
an electro-optic medium disposed between the first electrode and the second electrode;
wherein each of the web substrates form a plurality of edges forming a perimeter of the web substrates and the first perimeter seal comprises a flexible seal laminated in connection with each of the first web substrate and the second web substrate via a barrier tape adhered to the perimeter of the web substrates, and wherein the plurality of edges comprise:
  a first edge portion in connection with a first electrical terminal in connection with the first electrode; and
  a second edge portion opposing the first edge portion in connection with a second electrical terminal in connection with the second electrode; and
a second perimeter seal extending along each of the plurality of perimeter edges between the first web substrate and the second web substrate.

* * * * *

UNITED STATES PATENT AND TRADEMARK OFFICE
CERTIFICATE OF CORRECTION

PATENT NO. : 11,467,462 B2
APPLICATION NO. : 16/705501
DATED : October 11, 2022
INVENTOR(S) : DeNolf et al.

It is certified that error appears in the above-identified patent and that said Letters Patent is hereby corrected as shown below:

In the Claims

Column 17, Line 12, "sea I" should be --seal--.

Signed and Sealed this
Thirty-first Day of January, 2023

Katherine Kelly Vidal
*Director of the United States Patent and Trademark Office*